(12) United States Patent
Stapleton

(10) Patent No.: US 7,905,757 B1
(45) Date of Patent: Mar. 15, 2011

(54) CONNECTORS FOR MULTI-FACETED MODULES

(76) Inventor: Jonathan Walker Stapleton, Bothell, WA (US)

( * ) Notice: Subject to any disclaimer, the term of this patent is extended or adjusted under 35 U.S.C. 154(b) by 1136 days.

(21) Appl. No.: 11/400,119

(22) Filed: Apr. 7, 2006

Related U.S. Application Data

(60) Provisional application No. 60/669,829, filed on Apr. 8, 2005.

(51) Int. Cl.
*A63H 33/04* (2006.01)
(52) U.S. Cl. .......................................... 446/85; 446/124
(58) Field of Classification Search ............... 24/583.11, 24/662, DIG. 38; 52/592.1, 592.6, 604; 405/DIG. 25; 403/326, 282
See application file for complete search history.

(56) References Cited

U.S. PATENT DOCUMENTS

| | | | |
|---|---|---|---|
| 2,570,625 A | 10/1951 | Zimmerman | |
| 3,184,822 A | 5/1965 | Vega | |
| 3,263,292 A * | 8/1966 | Fekete | 24/595.1 |
| 3,413,752 A | 12/1968 | Perry | |
| 3,545,048 A * | 12/1970 | Daddona, Jr. et al. | 24/586.11 |
| 3,611,620 A | 10/1971 | Perry | |
| 3,659,360 A | 5/1972 | Zeischegg | |
| 4,204,596 A * | 5/1980 | Davis | 206/203 |
| 4,238,905 A | 12/1980 | MacGraw | |
| 4,581,792 A * | 4/1986 | Spier | 24/586.11 |
| 4,634,204 A * | 1/1987 | Detter et al. | 439/347 |
| 4,731,041 A | 3/1988 | Ziegler | |
| 5,009,625 A | 4/1991 | Longuet-Higgins | |
| 5,098,328 A | 3/1992 | Beerens | |
| 5,259,505 A * | 11/1993 | Sobel | 206/509 |
| 5,567,194 A | 10/1996 | Stapleton | |
| 5,667,326 A * | 9/1997 | McGaffigan | 446/126 |
| 5,746,638 A | 5/1998 | Shiraishi | |
| 6,490,739 B1 * | 12/2002 | Lee | 4/293 |
| 6,648,715 B2 | 11/2003 | Wiens et al. | |
| 6,749,480 B1 | 6/2004 | Hunts | |

* cited by examiner

*Primary Examiner* — Gene Kim
*Assistant Examiner* — Urszula M Cegielnik

(57) ABSTRACT

A system of releasable connectors moldable at various angles, comprising a male arch and a female slot. The male arch resembles an inverted V, having a substantially isosceles outline and a central void adjacent to its base. The female slot has two opposing and medially-facing projections midway along the long edges of its mouth. A secure but releasable connection is made when the male arch is inserted into the female slot, causing the projections of the female slot to become seated in the void of the male arch. Both the male arch and the female slot can be molded at a variety of angles. This feature allows them to be incorporated into multiple, differently-inclined regions of the same piece of molded material.

19 Claims, 25 Drawing Sheets

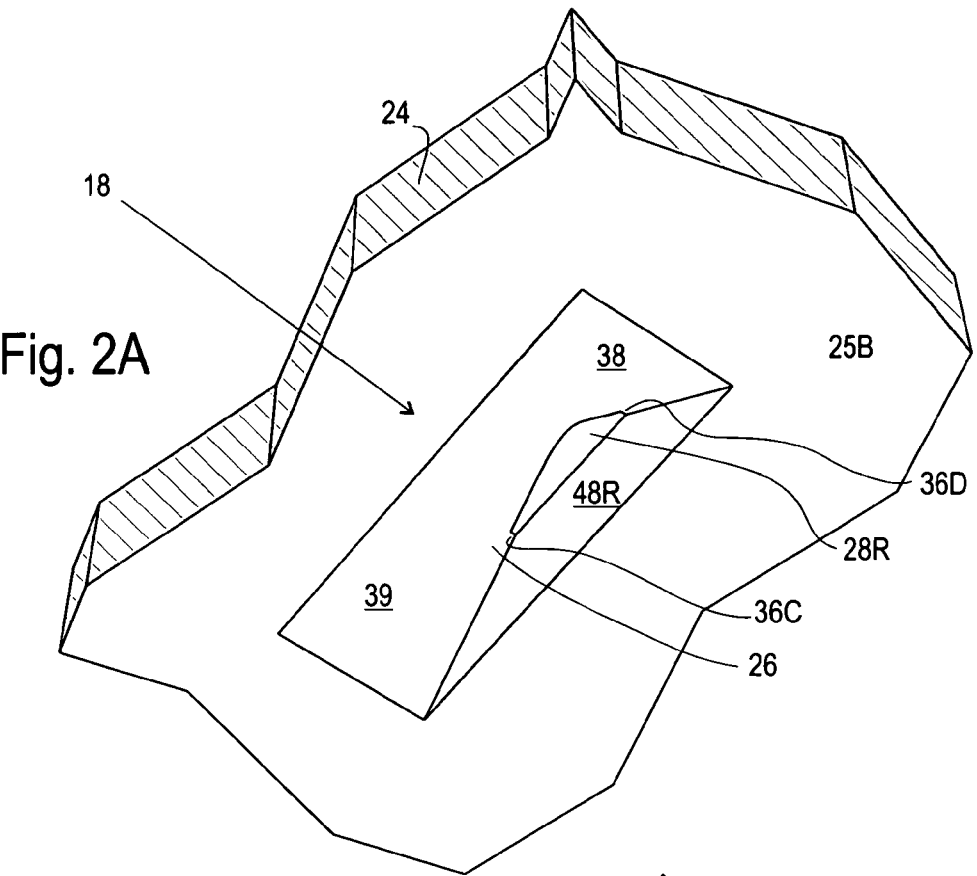
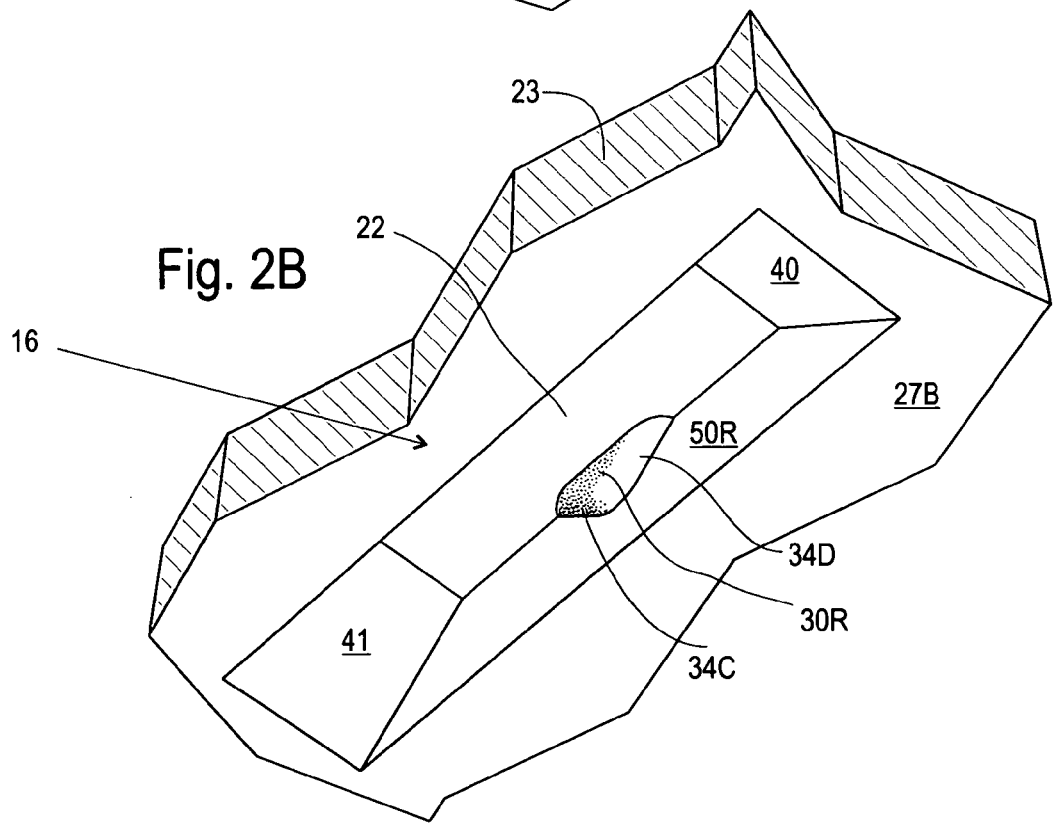

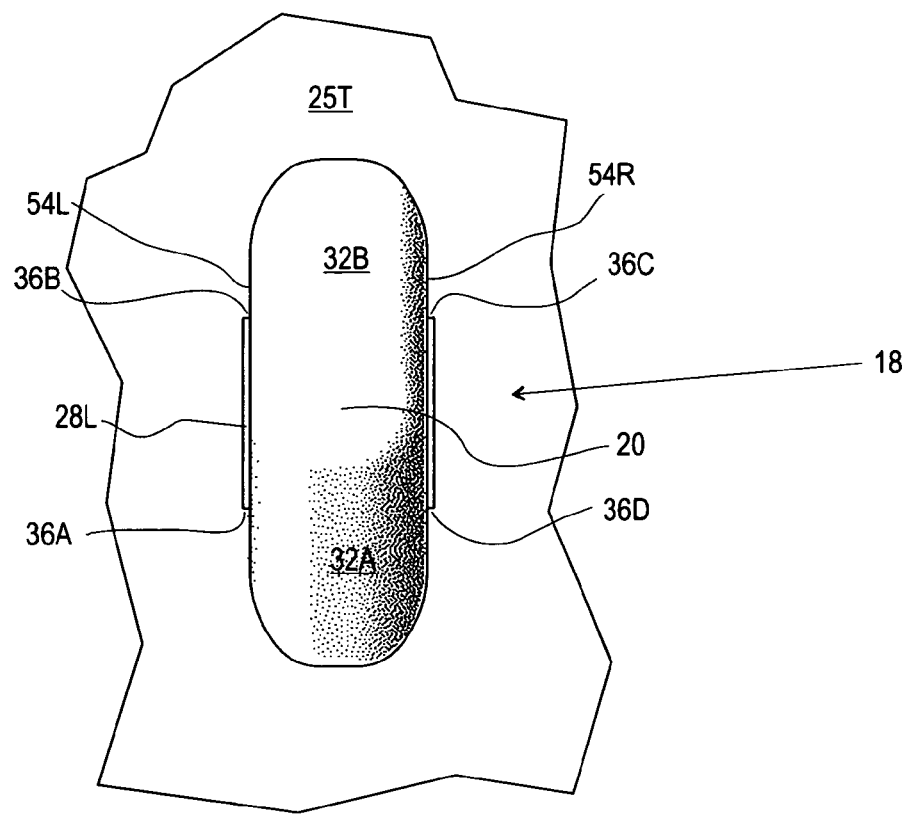
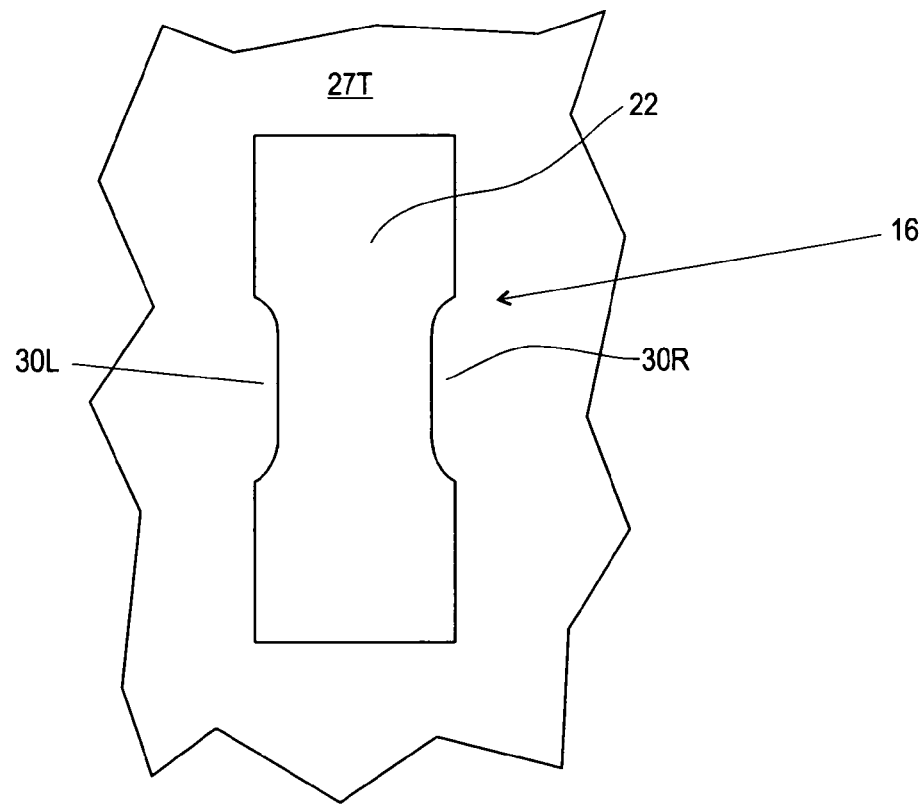

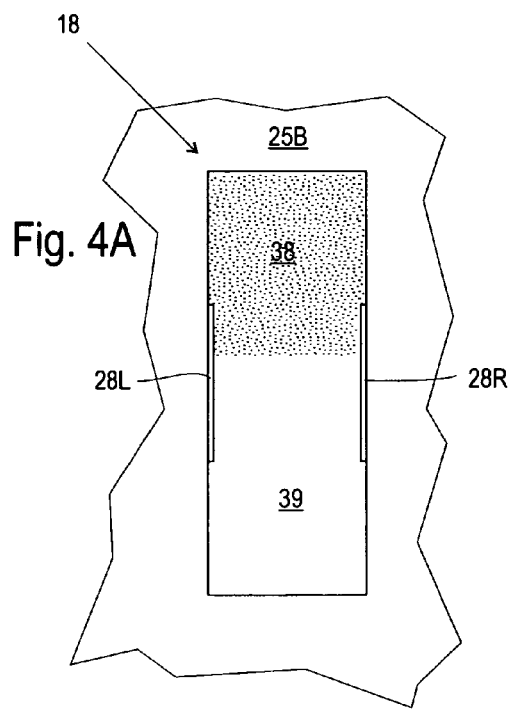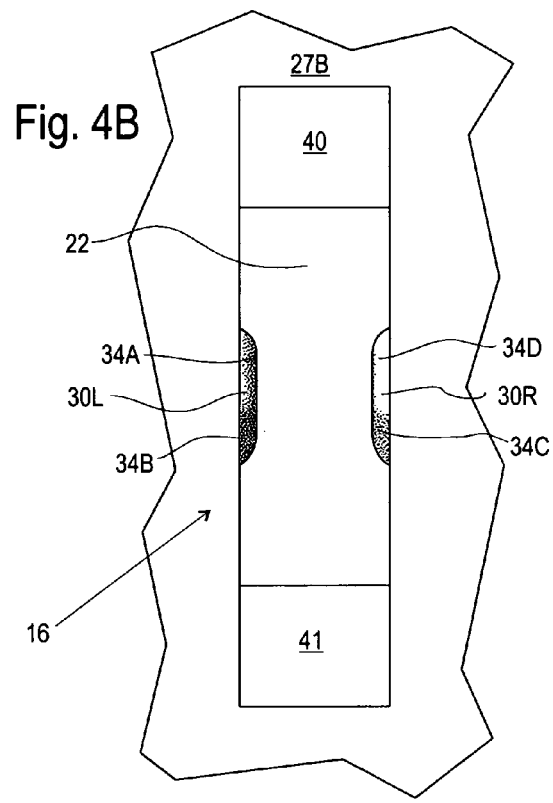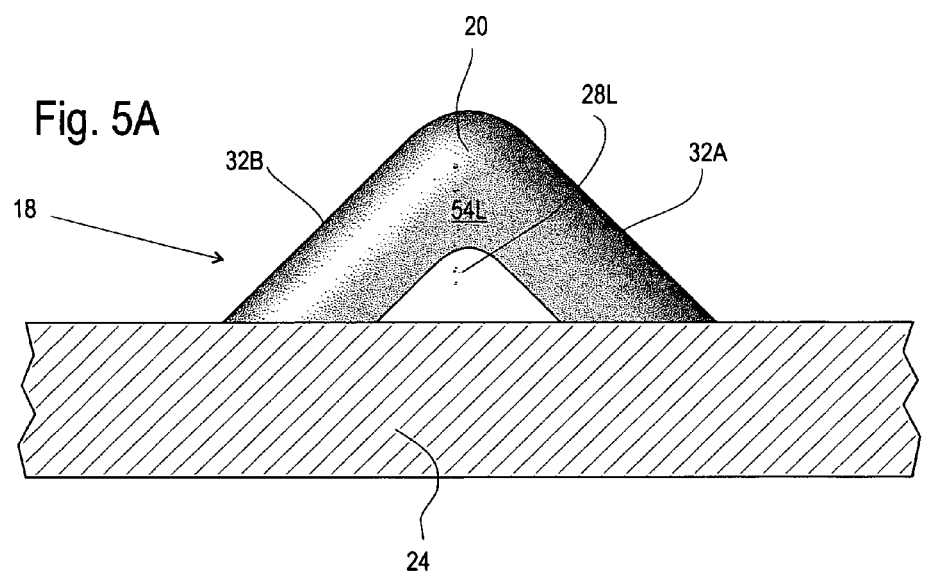

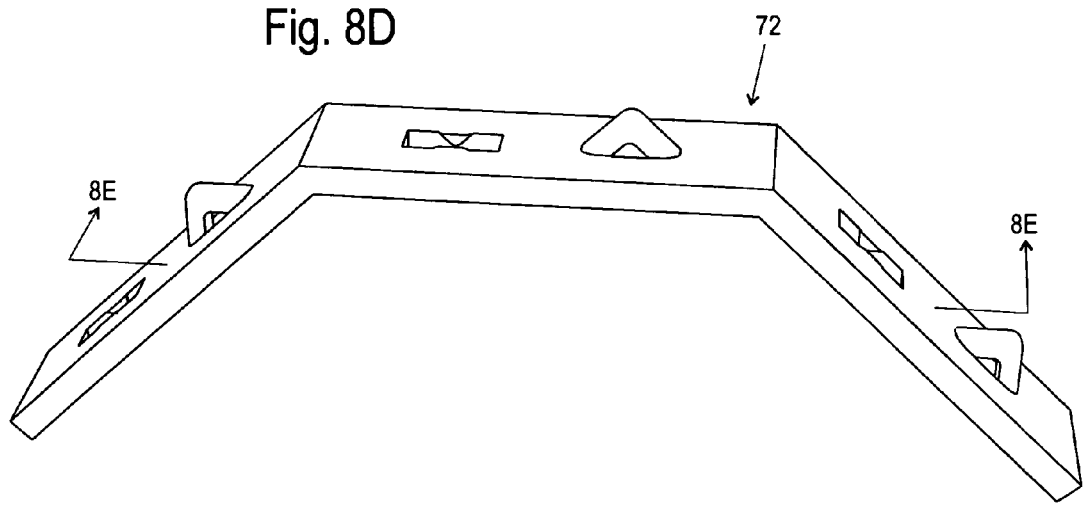
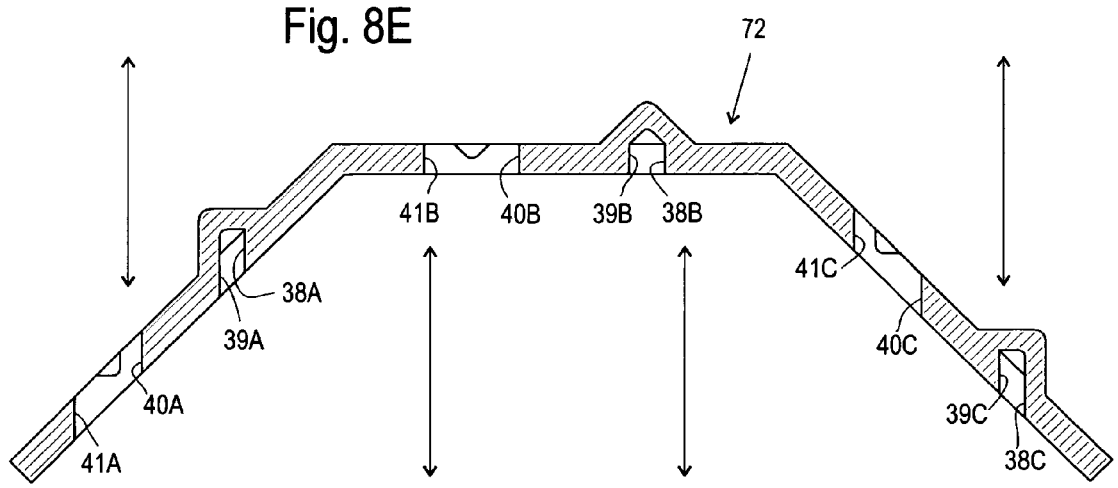

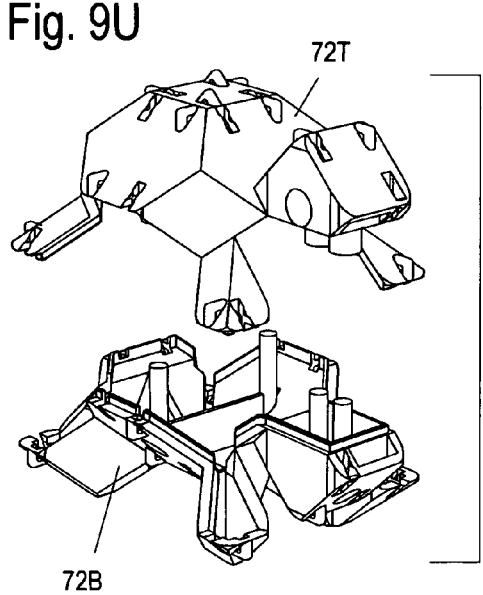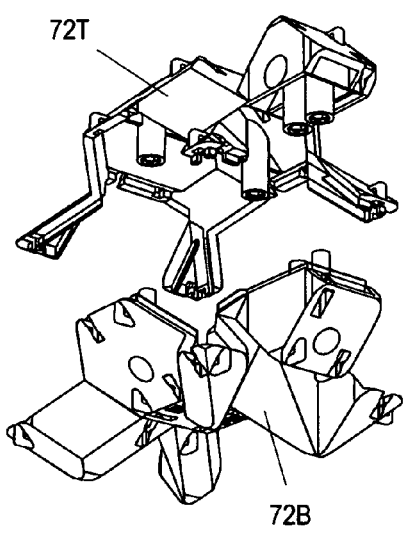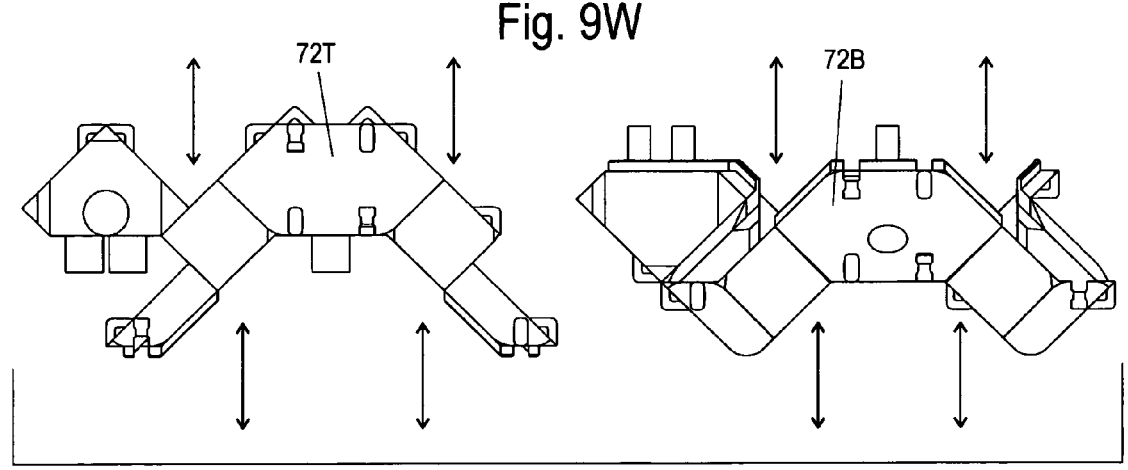

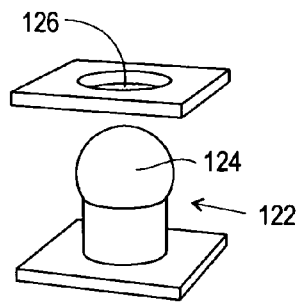
Fig. 11Q
Prior Art
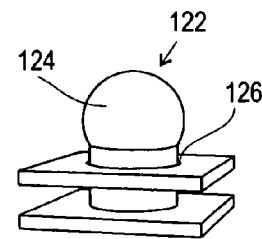
Fig. 11R
Prior Art
Fig. 11S
Prior Art
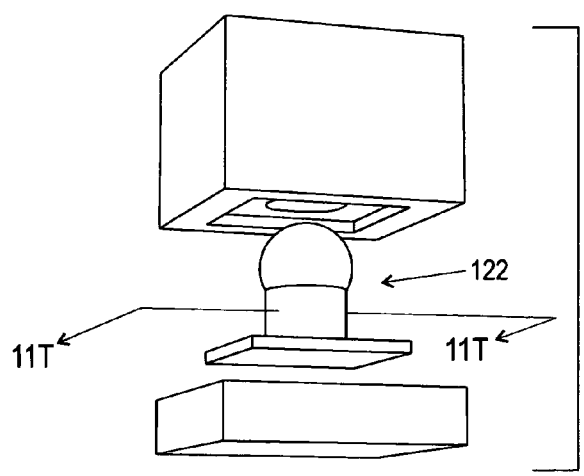
Fig. 11T
Prior Art
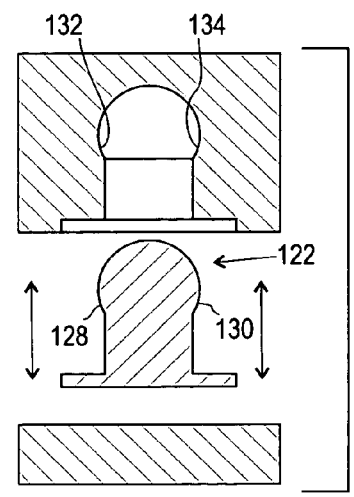
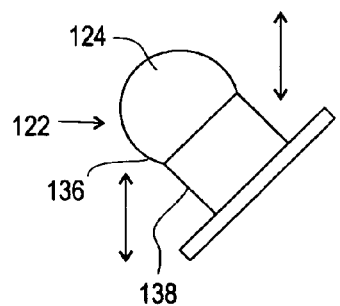
Fig. 11U
Prior Art

CONNECTORS FOR MULTI-FACETED MODULES

CROSS-REFERENCE TO RELATED APPLICATIONS

This application claims the benefit of provisional patent application Ser. No. 60/669,829, filed 2005 Apr. 8 by the present inventor.

FEDERALLY SPONSORED RESEARCH

Not Applicable

SEQUENCE LISTING OR PROGRAM

Not Applicable

BACKGROUND OF THE INVENTION

1. Field of the Invention

FIGS. 10A-11U, 9I, 9U

This invention relates to a means of connecting construction toy modules, specifically to an improved system for connecting modules with varying surface inclinations. It is sometimes desirable for a construction module to have a plurality of non-parallel surface portions, each of which is capable of connecting to the surfaces of another identical module. In this manner, complex construction modules can be aligned, abutted, linked, and possibly nested in many orientations to fill space or to build interesting and long lasting structures. For example, FIG. 10A shows a multi-faceted construction module, from my prior U.S. Pat. No. 5,567,194 (Stapleton, Oct. 22, 1996), that can be aligned, abutted, linked, and nested in many interesting orientations. It is desirable for this module, and others like it, to have compatible connective means incorporated into its multiple, non-parallel surface portions. [Although modules with varying surface inclinations may have planar and/or curved surfaces, they will be referred to throughout this document simply as "multi-faceted modules."]

2. Prior Art

The prior art is crowded with construction modules and their connectors. However, while each of these connection methods has its own unique advantages, none of them offers a complete set of solutions to the problems posed by the connection of multi-faceted modules. since the novelty of my connectors lies in the fact that they represent a first complete solution to all of these problems, the relevant advantages and disadvantages of several categories of prior art connectors must be discussed. Those categories can be described as non-tapering friction-fit connectors, general friction-fit connectors, snap-fit connectors, supplementary (external) connectors, combinations of connectors, and "attractive force" connectors.

BACKGROUND

Prior Art—Non-Tapering Friction-Fit Connectors

Perhaps the most well known category of construction module connectors are the non-tapering friction-fit connectors. These friction-fit connectors are simple and affordable to manufacture. Common examples include the "Stud and recess" connectors used in simple brick-type construction blocks, as well as dovetail connectors. Common to all of these connectors is a protruding male member with little or no taper at some point along its length, possibly along its entire length, and a corresponding female recess into which the male member engages. The fact that these friction-fit connectors do not have a significant taper along the lengths of their male members facilitates their locking together when engaged. Ironically, that lack of significant taper is also what prevents them from being easily incorporated into multi-faceted modules.

The initial reason for the failure of non-tapering friction-fit connectors is that they cannot be easily molded into the variously inclined surfaces of multi-faceted modules. When any non-tapering connectors are incorporated into variously inclined surfaces, they present problematic "undercuts" that cannot be molded with a "straight-pull" mold. An understanding of the previous statement is crucial to a full appreciation of the limitations of prior art connectors. Therefore, in the following inset paragraph, the terms "undercut" and "straight-pull" mold will be described and related to the injection molding process.

Molding Terms

A "straight-pull" mold is a mold consisting of two halves whose movements are limited to a linear path—back and forth, together and apart. That linear path is known as their "direction of pull." During the first stage of the injection molding process, the two mold halves slide together. The contacting faces of the mold halves are carved out in such a manner that, when they are together, a small cavity is formed between them. In the second stage of the injection molding process, molten plastic is injected under pressure into the cavity between the mold halves, and there it is allowed to cool and solidify. In the final stage of injection molding, the mold halves slide away from one another, thus releasing the newly-formed plastic part. FIG. 11A (perspective view) shows a simple plastic part 90, with tapering projections 91. FIG. 11B is a perspective view showing two simplified mold halves 92T and 92B that are in the process of forming plastic part 90. In FIG. 11B, plastic part 90 is hidden from view. In FIG. 11C (sectional view of FIG. 11B), newly-formed plastic part 90 is visible between mold halves 92T and 92B. FIG. 11D is a sectional view showing what happens when mold halves 92T and 92B pull apart along their direction of pull (indicated by arrows). FIG. 11D shows that plastic part 90 can, in fact, be released by both mold halves. In other words plastic part 90 can be molded using a simple, straight-pull mold. FIG. 11E (perspective view) shows a plastic part 94 with non-tapering studs 93, 95, and 97. Plastic part 94 cannot be molded with a simple, straight-pull mold. FIG. 11F is a perspective view showing two simplified mold halves 96T and 96B that are in the process of forming plastic part 94. In FIG. 11F, plastic part 94 is hidden from view. In FIG. 11G (sectional view of FIG. 11F), plastic part 94 is visible between mold halves 96T and 96B. FIG. 11H is a sectional view showing what happens when the mold halves 96T and 96B pull apart. As FIG. 11H shows, plastic part 94 cannot be released by mold half 96T. Plastic part 94 gets stuck. Surfaces 98 and 100 of the plastic part 94 are undercuts. Undercuts are portions of a plastic part that prevent its release by interfering with portions of the mold. In this example, surfaces 98 and 100 of the plastic part 94 interfere with surfaces 102 and 104, respectively, of mold half 96T. Plastic parts like plastic part 94 cannot be molded with a simple straight-pull mold, because their undercuts cause them to get stuck in the mold. While it is possible to circumvent the problems created by undercuts by creating a complex mold with multiple directions of mold pull, it is always economically preferable to use a simple, straight-pull mold.

BACKGROUND

Prior Art—Non-Tapering Friction-Fit Connectors (Contd.)

Plastic part 94 (FIG. 11E) is representative of the undercut problems facing non-tapering friction-fit connectors. Studs 93, 95, and 97 are similar to the male projections of "stud and recess" connectors. It can be seen in FIGS. 11G and 11H that only stud 95 is free of undercuts. FIG. 11H shows that connectors with non-tapering projections similar to studs 93, 95, and 97, can only be easily molded when the direction of mold pull (indicated by arrows) is parallel to the lengths of their studs. As shown in FIG. 11H, stud 95 is the only stud whose height is parallel to the direction of mold pull. Non-tapering friction-fit connectors can only be easily incorporated into multiple molded surfaces when those surfaces are all perpendicular to the direction of mold pull and, therefore, parallel to one another. A multi-faceted construction module, however, needs to have connectors not only on surfaces that are parallel, but also on surfaces that are inclined to one another at a variety of angles.

It should be noted that a complex and expensive mold, unlike the simple, straight-pull molds shown in FIGS. 11G and 11H, might be able to mold non-tapering studs into one or two variously inclined surfaces. However, such a mold would require expensive "side actions," additional portions of a mold that move in and out in directions that are not parallel to the primary direction of mold pull. Furthermore, to mold non-tapering connectors into the numerous, variously inclined surfaces of a complex multi-faceted module is virtually impossible, even with a very complex and expensive mold. FIG. 9U demonstrates the magnitude of this problem by showing two halves 72T and 72B of a complex multi-faceted construction module. In module half 72T, for example, connectors are simultaneously molded into 17 surfaces, which are each inclined to the direction of mold pull at one of 5 different inclinations.

Some inventors have approached the problem of molding non-tapering friction-fit connectors by breaking their modules into several parts that must then be assembled. Beerens' U.S. Pat. No. 5,098,328 (Mar. 24, 1992), and Ziegler's U.S. Pat. No. 4,731,041 (Mar. 15, 1988), both disclose systems whereby connectable, multi-faceted modules could be constructed from several individually-manufactured surfaces. FIG. 11I is a perspective view of the outside of a cube construction module invented by Beerens. FIG. 11J is an inside perspective view of a portion of Beerens' construction module. FIG. 11J shows how Beerens' cube might be constructed from several parts, one for each of the cube's six faces. Beerens' and Ziegler's approach allows the connectors on each module face to be molded at whatever angle is necessary in order to avoid undercuts. While the approach enabled connectors to be incorporated into a number of surfaces, the increase in the number of parts creates a corresponding increase in the cost and the time required to manufacture and assemble modules. One more drawback to these multi-part designs is that they tend to be less aesthetically pleasing than simpler designs with fewer parts.

A lack of significant taper also prevents connectors from engaging with one another at a variety of angles. This means that, even if non-tapering friction-fit connectors could be easily incorporated into multi-faceted modules, they would still fail as an effective means of connection. With multi-faceted modules, it is often the case that multiple pairs of mating surfaces need to engage simultaneously at different angles of approach. FIGS. 11K, 11L, and 11M show that such engagement is not possible with non-tapering friction-fit connectors, such as "stud and recess" connectors. FIG. 11K is a perspective view of an imaginary multi-faceted construction module with traditional non-tapering connectors. FIG. 11L is a perspective view of several of these modules, three of which are joined together, and one which is hovering above the other three, preparing for engagement. FIG. 11M is a sectional view of FIG. 11L. In FIG. 11M, arrows indicate the direction of attempted engagement. It can be seen in FIG. 11M that, if module 105 were slid downward for engagement, surfaces 106, 108, 110, and 112 of module 105 would collide with surfaces 114, 116, 118, and 120, respectively. This collision would prevent engagement of some male studs into their counterpart female recesses. For example, male stud 107 would not be able to be seated in recess 109.

Another related disadvantage of non-tapering connectors' inability to engage at multiple angles is that, when a planar array of connectors must be engaged, they must all be engaged at once. FIGS. 11N and 11P demonstrate an attempt to engage two modules with non-tapering connectors, one connector at a time. FIG. 11N is a perspective view, and FIG. 11P is a sectional view of FIG. 11N. As FIG. 11P shows, this manner of connection cannot work, because corner 111 interferes with corner 113. Since each connector can only be engaged from one and the same angle of approach, both connectors must be engaged at once. Because planar arrays of non-tapering connectors must be engaged all at once, more force is necessary than if they could be connected one at a time. Conversely, when planar arrays of non-tapering connectors are disengaged, they must be disengaged all at once, presenting the same problem. Furthermore, because an entire planar array of connectors must be engaged simultaneously, they must be aligned simultaneously, which may be more difficult and frustrating than aligning and engaging them one at a time.

BACKGROUND

Prior Art—Friction-Fit Connectors, Generally

Beyond the specific limitations of the non-tapering aspect of common friction-fit connectors, there are other broad limitations specific to the friction-fit itself, with respect to its use with multi-faceted modules. Before I discovered a way to create my current snap-fit connectors, I first invented some tapering friction-fit connectors and had them manufactured. Their male portions resembled projections 91 in FIG. 11A (perspective view). Though my friction fit connectors were moldable at varying angles with a straight-pull mold, and though they did work to some degree, they were ultimately unsatisfactory. The disadvantages of friction-fits enumerated in the following paragraphs were discovered from this personal experience with my own failed prior art.

One general limitation of friction-fits is that they require inhibitively precise tooling tolerances. With a friction-fit, a male projection and its corresponding female recess must be proportioned very precisely so that their fit is not too tight and not too loose. In some cases a difference of a few thousandths of an inch can be tragic. A multi-faceted module, such as the modules shown in FIG. 9I (perspective view), may have over forty pairs of connectors, and adjusting the mold so that the fit of each of these connectors is satisfactorily compatible with every other connector is a daunting task.

A second limitation of friction-fits is that, because they engage so precisely with one another, engaged friction-fit connectors have little or no "play" in their connections. This means that the modules into which they are incorporated must also meet very restrictive tolerances. If there is a slight dimensional inaccuracy in the body of a construction module or the placement of connectors on its surface, the module's connectors might not align correctly with those of an adjacent module. Misalignment of an already finicky friction-fit might easily render it ineffective. This problem is compounded when multiple modules are used to build complex structures, a ring for example. With each imperfect module that is added to a ring, even a small dimensional inaccuracy becomes compounded. Due to the cumulative effect of each module's slight dimensional inaccuracy, the entire structure will need to flex somewhat in order for the final module to complete the ring by connecting to the first module. A friction-fit connector system, having very little "play," tends to not allow such a closure. Also, when there is no "play" in module connections, minor and accidental wiggles, flexes, and other perturbations tend to cause module structures to fall apart.

A third limitation of friction-fits with respect to their use with multi-faceted modules is that a continued state of engagement can tend to deform and "loosen" friction-fit connectors. Friction-fit connectors that are left engaged often tend to loosen up in proportion to the time that they are left engaged, as the male member becomes compressed and the female recess becomes stretched. Unless their integrity is assisted by gravity, structures made of modules with friction-fit connectors have a tendency to loosen, and even fall apart, when left alone.

It should be noted that, in some cases, when a male member is tall enough to protrude through a female hole and into the cavity of an adjacent module, the detrimental effect of previously described "loosening" can be reduced. In these cases, after a short period of compression, as it passes through the female hole, the tip of the male member can re-expand, creating an anchor inside the cavity of the adjacent module. Unfortunately, at the small scale required by many multi-faceted modules, this type of arrangement is not an option. For example, in modules that I have recently created, the male members protrude only 2.41 mm from a module's surface while the modules' wall thicknesses are 1.78 mm. At this scale, the portion of a male member penetrating through an adjacent module's wall thickness is, at most, 26% of its protruding distance and less than 7% of its friction-providing surface area. That is not enough penetration to allow significant, anchoring resilience of the male member.

One last limitation of friction-fit connectors is that the act of engaging friction-fit connectors is relatively unsatisfying. This is partly because a constant or increasing force is required during the entire process of their engagement, and applying such a force can be uncomfortable. Engaging friction-fit connectors is also unsatisfying because, at the end of engagement, there is no clear, satisfying sensation that the connection is complete. There is no "snap."

BACKGROUND

Prior Art—Traditional Snap-Fit Connectors

Traditional snap-fit connectors are another category of construction toy connectors well represented in the prior art. With respect to their compatibility with multi-faceted modules, prior art examples of snap-fit connectors represent distinct improvements over friction-fit connectors, but they also have one insurmountable shortcoming.

Traditional snap-fit connectors represent an improvement over friction-fit connectors in that they require looser tooling tolerances. Since male and female snap connectors must deform only momentarily past a point of interference, they must not necessarily be created with precise proportions along their entire lengths. Though the ultimate connection may be as strong as or stronger than a friction-fit connection, the evanescence of this deformation makes snap-fit connectors easier to engage and disengage. It also provides, upon engagement, a satisfying audible and/or tactile sensation of completion—a snap. Another advantage of snap-fit connectors is that they allow a degree of movement, or "play," once engaged, so that a group of modules connected by snap-fits can flex and wiggle somewhat without becoming disconnected. Again, this affords snap-fit modules the advantage of looser tooling tolerances, because those modules' geometries do not have to be perfect in order for a group of them to nest or stack together. Also, when structures are built with multiple modules, this "play" allows a user to wiggle and flex the previously attached modules without having portions of the structure fall apart. Furthermore, once snap-fit connectors are engaged, there is no continued deformation of the connectors. Thus there is no continued loosening of the fit as is common with friction-fit connectors.

Despite all of these advantages over friction-fits, all prior art examples of snap-fit connectors have a tragic flaw with respect to their use with multi-faceted modules. The flaw is that traditional snap-fit connectors represent an even more difficult molding challenge than do non-tapering friction-fit connectors. Traditional snap-fit connectors not only do not taper; they actually have a negative taper.

A representative traditional snap-fit system, a "ball and socket" connection, illustrates this central shortcoming of traditional snap-fit connectors with regard to use with multi-faceted modules. FIG. 11Q shows a simple example which is representative of ball and socket connectors. FIG. 11Q (perspective view) shows a male member 122 that has an enlarged "head" 124 which is slightly larger than the entry to a corresponding female recess 126. FIG. 11R is a perspective view of the same connectors in an engaged configuration. The problem is that, if a male member such as male member 122 were installed on the surfaces of a multi-faceted module, it would present problematic undercuts on nearly every surface. FIG. 11S is a perspective view of male member 122 and the mold halves that might be used to create that member. The arrows in FIG. 11S indicate the direction of mold pull. FIG. 11T (sectional view of FIG. 11S) shows that downward-facing surfaces 128 and 130 of the male member 122 are undercuts which would prevent male member 122 from being released from the top half of its mold. Those undercuts would interfere with upward-facing surfaces 132 and 134 of the top mold half. When a male snap fit member is inclined relative to the direction of mold pull, this problem is even worse. FIG. 11U shows the same male snap-fit member 122 in an orientation tilted relative to the directions of mold pull (indicated by arrows). In this orientation, downward-facing surfaces 136 and 138 are undercuts. The undercut dilemma makes snap-fit connectors tricky to incorporate into any type of module, much less a complex multi-faceted module. The problem of undercuts is one reason why most popular brick-type construction toys incorporate a friction-fit.

Perry's U.S. Pat. Nos. 3,413,752 (Dec. 3, 1968) and 3,611,620 (Oct. 12, 1969) addressed the problem of undercuts with his snap-fit connection system for multi-faceted modules. Perry disclosed a system in which snap mechanisms could be separately manufactured and then inserted into the surfaces of multi-faceted modules. Although Perry did manage to circumvent undercuts, his solution required extra parts and labor.

Inventors who might have incorporated a snap-fit connection into multi-faceted modules seem to have been blinded by a firmly rooted paradigm. That paradigm is a male member, with an enlarged head, that cooperates with a female recess having an opening of smaller aperture. As explained above, such a system is simply incompatible with simple injection molding processes, especially when applied to multi-faceted modules.

BACKGROUND

Prior Art—Supplementary (External) Connectors

Another category of connection methods represented in the prior art incorporates supplementary friction-fit or snap-fit connecting members. This approach avoids the trouble of molding connectors into multiple non-parallel surfaces, but it presents several other drawbacks. First, supplemental connectors make a toy more expensive to produce, and they complicate packaging. Second, the end user's process of connecting multi-faceted modules with separate connectors is slower and more tedious when compared to connecting modules with built-in connectors. Third, separate connector pieces, which would tend to be smaller than the modules themselves, can be easily dropped and lost, and they might represent a choking hazard for young children. Last, construction toys that are simple without sacrificing function are, as a general rule, the most pleasing to use, and supplementary connectors add complexity.

BACKGROUND

Prior Art—Combinations of Connectors

Yet another prior art approach to connecting multi-faceted construction modules employs combinations of connector types, with different types of connectors being incorporated into different surfaces. U.S. Pat. No. 6,648,715 of Wiens, et al. (Nov. 18, 2003) describes a block module with stud and recess connectors on the top and bottom, and rib connectors on the sides. While this approach enables connectors to be easily molded into variously inclined surfaces, it prevents surfaces with different types of connectors from cooperating with one another. An ideal connection system for multi-faceted modules must include compatible connectors on all mating surfaces.

BACKGROUND

Prior Art—Attractive Force Connectors

One final category of multi-faceted module connectors represented in the prior art employs attractive forces. These connection systems employ some means of attraction, such as adhesives or magnets, rather than cooperating physical structures. Since they do not rely on male projections or female recesses, these connectors do not present all of the same difficulties with regard to angles of molding, angles of engagement, and compatibility between various surfaces. However, despite the fact that these connection systems solve important problems, both systems have serious drawbacks that render them infeasible for use with multi-faceted construction modules.

Zeischegg's U.S. Pat. No. 3,659,360 (May 2, 1972) describes a system of polyhedra that could be held together with adhesives. Unfortunately, adhesives, such as the double-sided tape he suggested, are laborious to apply and cosmetically unappealing. They can be also difficult or impossible to disconnect. They lose their stickiness, and they add excessive complexity to the construction modules to which they are stuck.

If they were not so expensive and difficult to manufacture, magnetic systems would be ideal for connecting multi-faceted modules. There are many examples in the prior art of magnetic connections for blocks. Zimmerman's U.S. Pat. No. 2,570,625 (Oct. 9, 1951) and Vega's U.S. Pat. No. 3,184,882 (May 25, 1965) provide early examples of magnetic connector systems for cube modules. McGraw's U.S. Pat. No. 4,238,905 (Dec. 16, 1980) disclosed several systems of magnets for connecting more complex, non-cube modules. A number of other patents, including Longuet-Higgins' U.S. Pat. No. 5,009,625 (Apr. 23, 1991), Shiraishi's U.S. Pat. No. 5,746,638 (May 5, 1998), and Hunts' U.S. Pat. No. 6,749,480 (Jun. 15, 2004), have disclosed more sophisticated magnetic systems for complex, non-cuboidal polyhedra. While all of these inventions can be effective means of connecting polyhedral modules, they are all complicated and relatively difficult to manufacture. As described in all of these patents, magnets must be incorporated beneath each of their numerous cooperating surfaces. Such an arrangement requires both numerous magnets and a housing for each magnet, as well as the labor to install the magnets correctly. Magnetically connectable multi-faceted modules are simply not economical.

BACKGROUND OF THE INVENTION

Objects and Advantages

Accordingly, it is the object of my invention to provide a means of connecting multi-faceted modules that has all of the advantages, and none of the disadvantages, of the prior art.

One specific object of my connectors is that they, as well as the modules into which they are incorporated, may be created with a simple, straight-pull mold. Furthermore, it is an object of my connectors that they may be incorporated into molded surfaces that are inclined to the direction of mold pull at a variety of angles. The primary advantage conferred by my connectors' moldability is that identical, compatible iterations of my connectors can be very easily and economically installed in multiple, variously inclined surfaces of a multi-faceted module.

A second object of my connectors is that they may engage with one another at a variety of angles. This feature of my connectors is an advantageous prerequisite for building many complex multi-faceted module configurations, since those configurations often require multiple pairs of mating surfaces to engage simultaneously at different angles of approach. Furthermore, this ability to engage at multiple angles means that two planar arrays of my connectors can be connected "piecemeal." Piecemeal connection reduces the force required to connect and disconnect arrays of my connectors and also reduces the difficulty of aligning those arrays prior to their engagement.

A third object of my connectors is to offer all of the aforementioned objects and advantages while incorporating a snap fit. A first advantage of my connectors' snap fit is that it affords my connectors relatively unrestrictive tooling tolerances. Even when they are produced by slightly inaccurate machining processes, they still work. A second advantage conferred by my connectors' snap fit is that, once engaged, their connections have a degree of "play." This "play" allows a user to wiggle, flex, and otherwise perturb multiple-module structures without necessarily causing those structures to come apart. This "play" in the connectors' connections also compensates for minor dimensional inaccuracies in the modules themselves, so that modules incorporating my connectors can still be snapped together, even if their surfaces or the connectors' placements in those surfaces do not align perfectly. A third advantage of my connectors' snap fit is that, once engaged, my connectors are not in a state of deformation. This means that they can be kept snapped together for long periods of time, without any deleterious loosening. A fourth advantage of my connectors' snap fit is that it enables them to be effective when they are scaled to a small size. My connectors are effective even when their male members are too small to penetrate significantly through the wall thickness of an adjoining module. One more advantage of my connectors' snap-fit is that it renders my connectors easy and pleasurable to use. Upon engagement, my snap-fit connectors provide a satisfying, audible and/or tactile sensation of completion. Simply put, they connect with a pleasant "snap."

A fifth object of my invention is to create snap-fit connectors, with all of the aforementioned objects and advantages, that can be created with a simple, sturdy, long-lasting mold.

Another object of my invention, unrelated to the disadvantages of the prior art, is to provide a connective force that is self-adjusting. During a "break-in" period of use, my connectors whose connections have been made too tight by the manufacturer quickly adjust to, but not beyond, an appropriate level of resistance.

Further objects and advantages of my invention will become apparent from a consideration of the drawings and ensuing description.

SUMMARY

In accordance with the present invention my connectors comprise a male connector, itself comprising an arch, and a female connector, itself comprising a slot with opposing medial projections situated midway along its length. My connectors are designed so that they may be molded at a variety of angles, relative the direction of mold pull. This can be accomplished as long as my connectors are oriented with their lengths paralleling any slope of the surface into which they are incorporated.

DRAWINGS

Figures

FIGS. 1A to 7B show the connectors. FIGS. 1 to 7 with an "A" suffix show the male connector, and those with a "B" suffix show the female connector.

FIGS. 8D and 8E show acceptable variations in the connectors' elements.

Figure 11A:
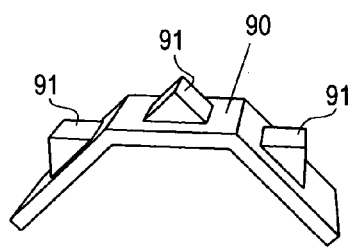
FIGS. 11A to 11D show an example plastic part with no undercuts, and a simplified version of the mold that might produce that part.
Figure 11B:
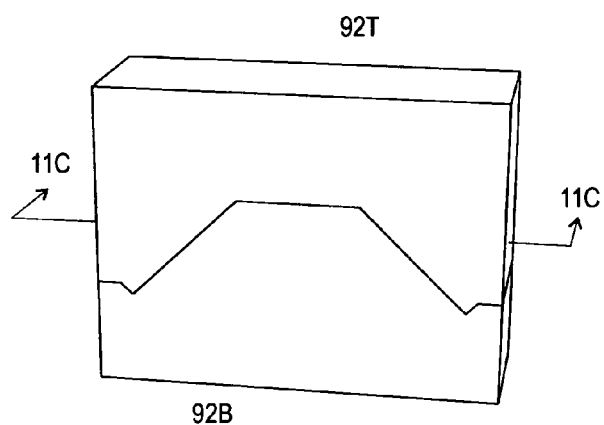
Figure 11C:
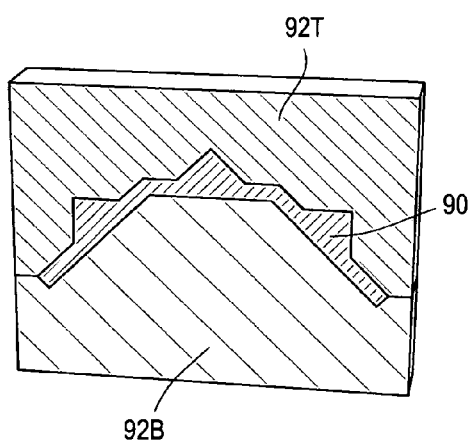
Figure 11D:
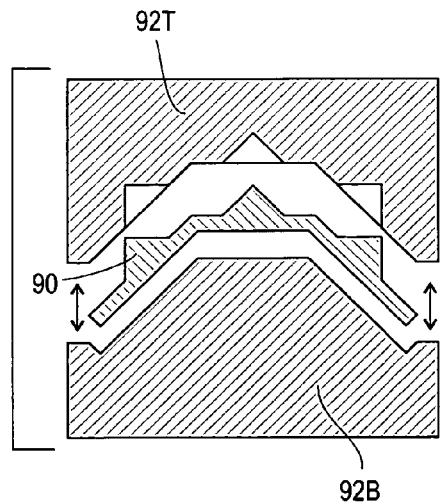
Figure 11E:
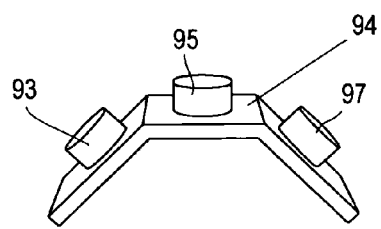
FIGS. 11E to 11H show a plastic part with friction-fit members representative of the prior art, in the act of failing to be released from a mold.
Figure 11F:
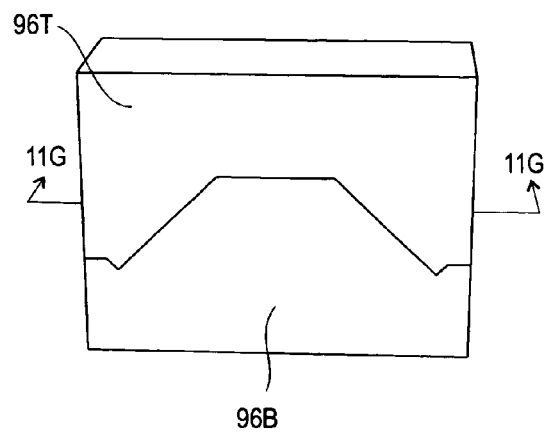
Figure 11G:
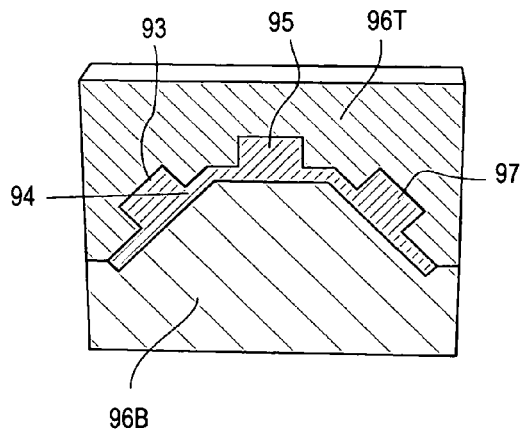
Figure 11H:
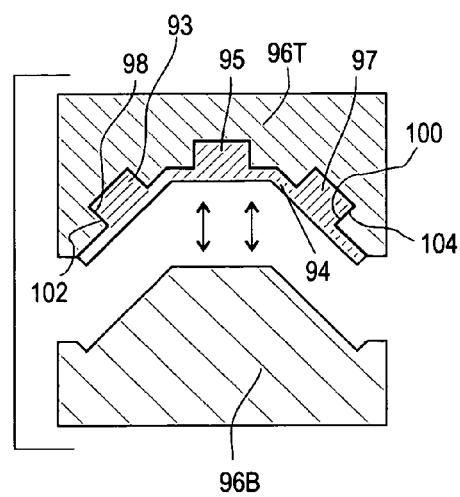
Figure 11I:
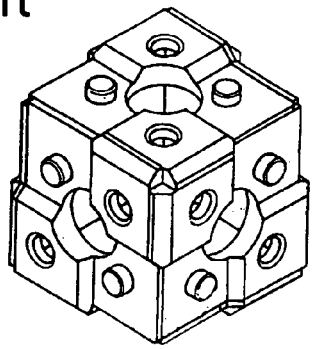
Figure 11J:
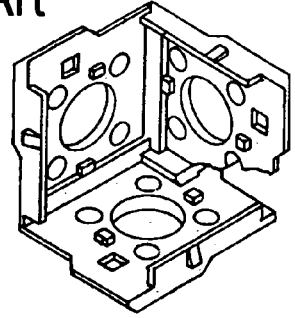

FIGS. 11I and 11J show a prior art module disclosed in Beerens'U.S. Pat. No. 5,098,328 (Mar. 24, 1992).

Figure 11K:
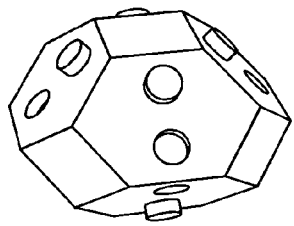
Figure 11L:
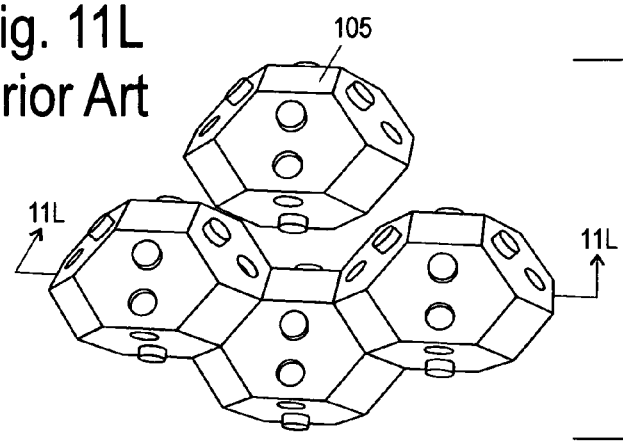
Figure 11M:
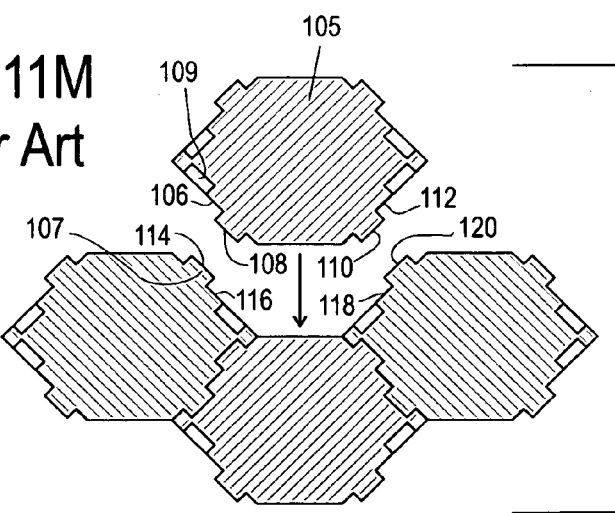

FIGS. 11K to 11M show modules with connectors representative of the prior art, in the act of failing to engage at varying angles of approach.

Figure 11N:
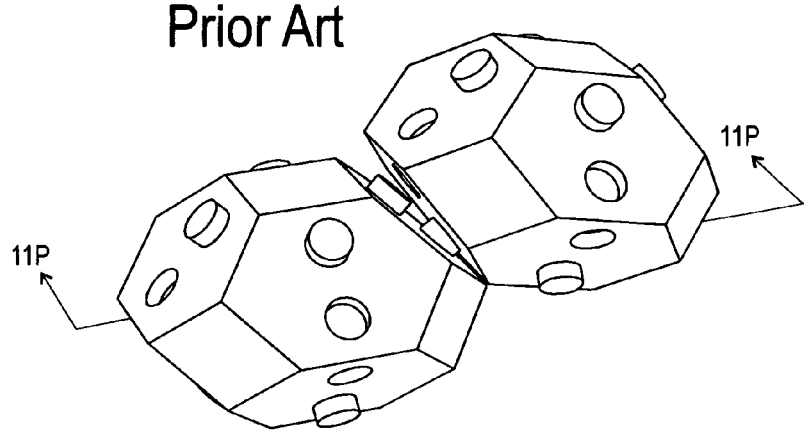
Figure 11P:
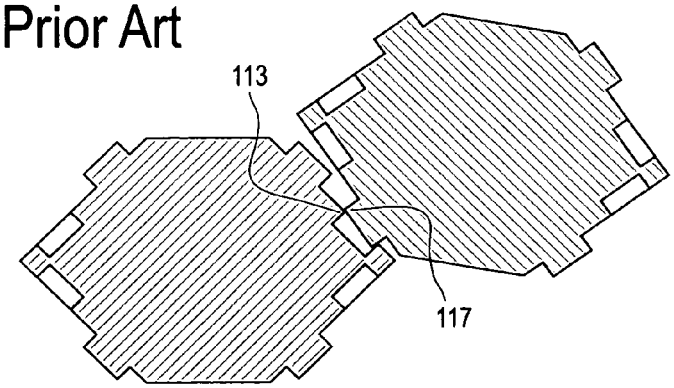

FIGS. 11N and 11P show two modules with connectors representative of the prior art, in the act of failing to engage "piecemeal."

FIGS. 11Q and 11R show a snap-fit connector pair representative of the prior art.

FIGS. 11S to 11T show a snap-fit male member representative of the prior art, and the mold that might produce it but in which it would actually become stuck.

FIG. 11U shows a snap-fit male member representative of the prior art in a tilted position, demonstrating its inability to be molded at the angle shown.

Figure 12A:
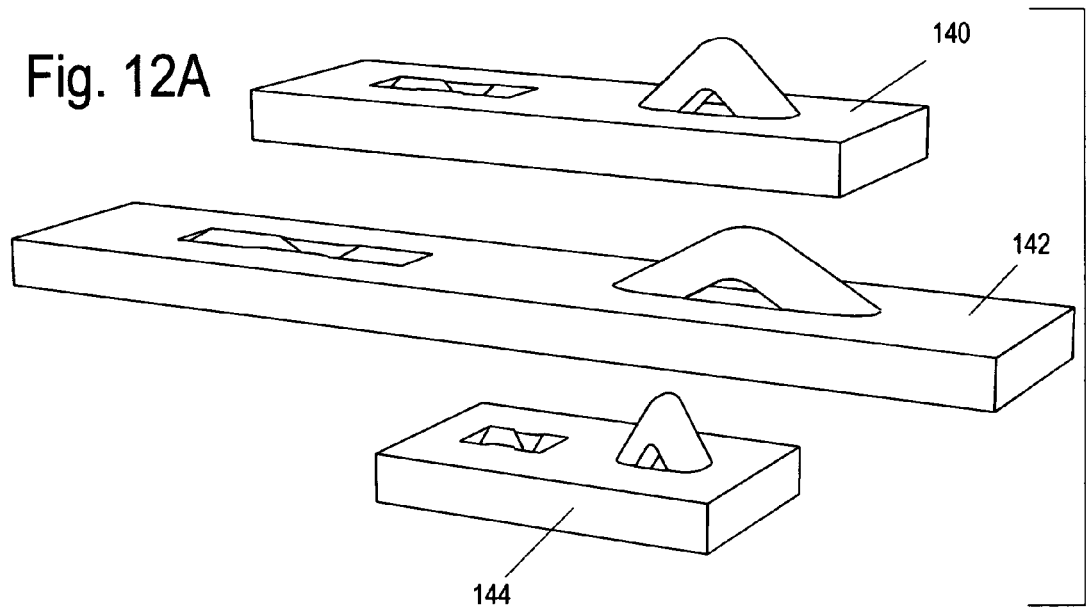

FIG. 12A shows three alternative embodiments of my connectors having features with altered angles.

Figure 12B:
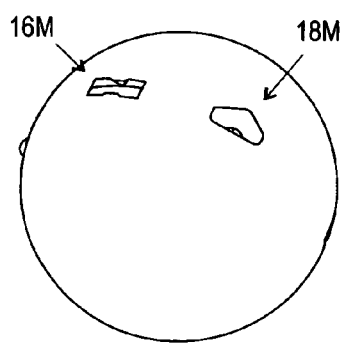

FIG. 12B shows my connectors incorporated into a spherical surface.

Figure 12C:
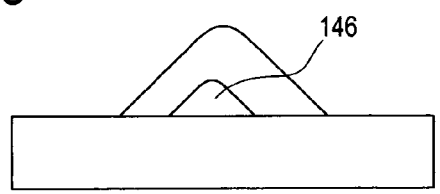

FIG. 12C shows an embodiment of my male connector having a void that is not centrally positioned.

Figure 12D:
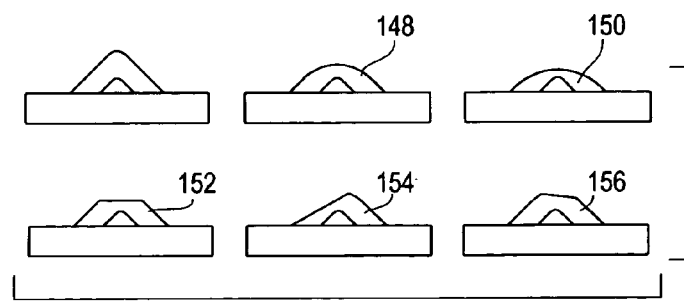

FIG. 12D shows several alternative embodiments of my male connector that demonstrate how its outer surfaces may vary.

DETAILED DESCRIPTION

Preferred Embodiment FIGS. 1-7, 8D, 8E

DETAILED DESCRIPTION

Preferred Embodiment—Basic Components

A preferred embodiment of my connection system consists of male and female connectors, each of which is intended to be a molded feature of a plastic construction module. In order to show the male and female components of my connectors in satisfactory detail, those male and female components are depicted in separate figures.

Figure 1A:
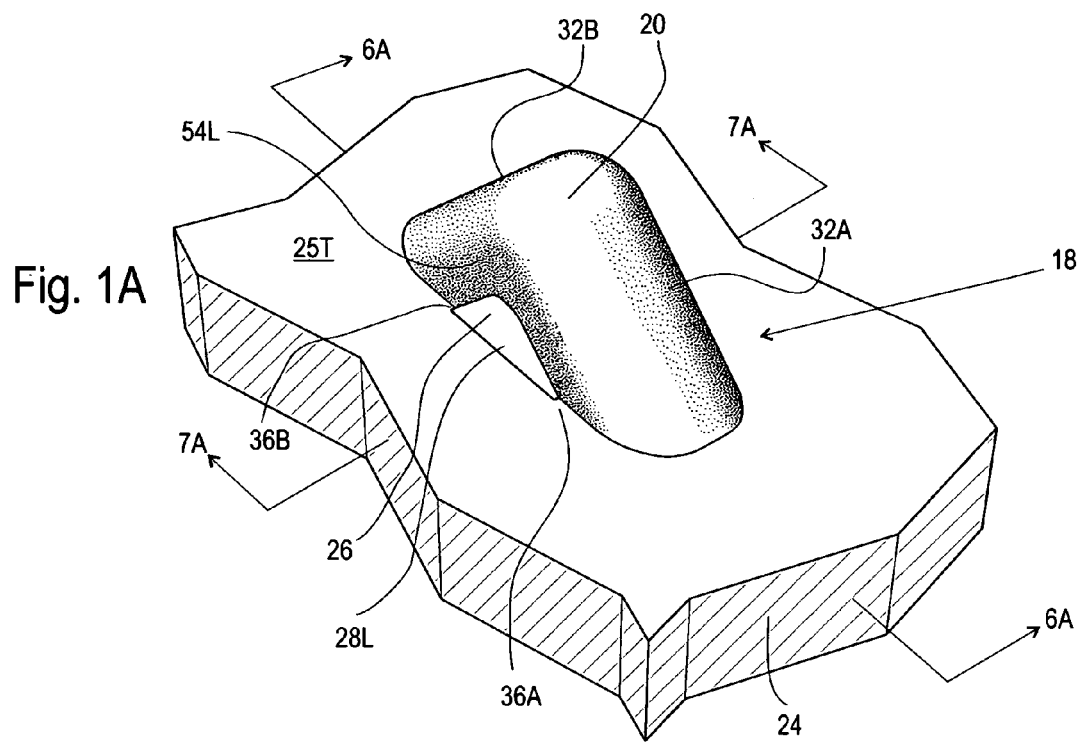
Figure 6A:
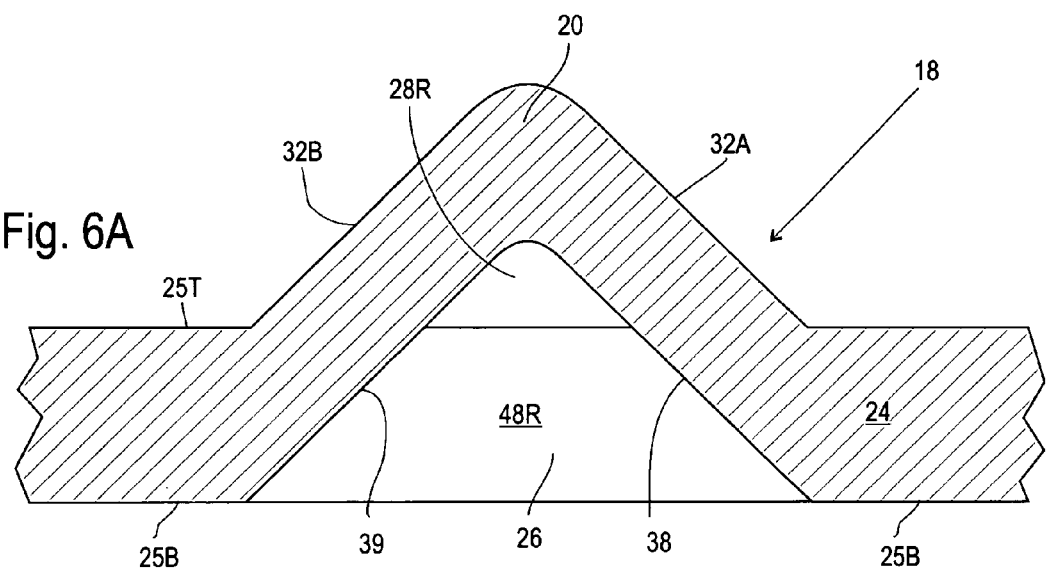

FIG. 1A (top perspective view) and FIG. 2A (bottom perspective view) show a male connector or snap 18 and its components, which are incorporated into a plastic wall 24. Male connector 18 includes an arch, perforated fin, tab, or male member 20 and a void 26, located beneath arch 20. Void 26 has roughly triangular openings or windows 28L and 28R to the sides of arch 20. Arch 20 has rounded upward-facing, adjacent surfaces 32A and 32B. Surfaces 32A and 32B meet at the midline of arch 20. FIG. 3A (top view) shows that arch 20 also has lateral surfaces 54L and 54R. FIG. 3A (top view)

shows that opening 28L extends a short distance away from arch 20 along edges 36A and 36B that are perpendicular to arch 20. Likewise, opening 28R extends a short distance away from arch 20 along edges 36C and 36D. In FIG. 6A (sectional view of FIG. 1A), it can be seen that plastic wall 24 has a top surface 25T that is parallel to its bottom surface 25B.

Figure 7A:
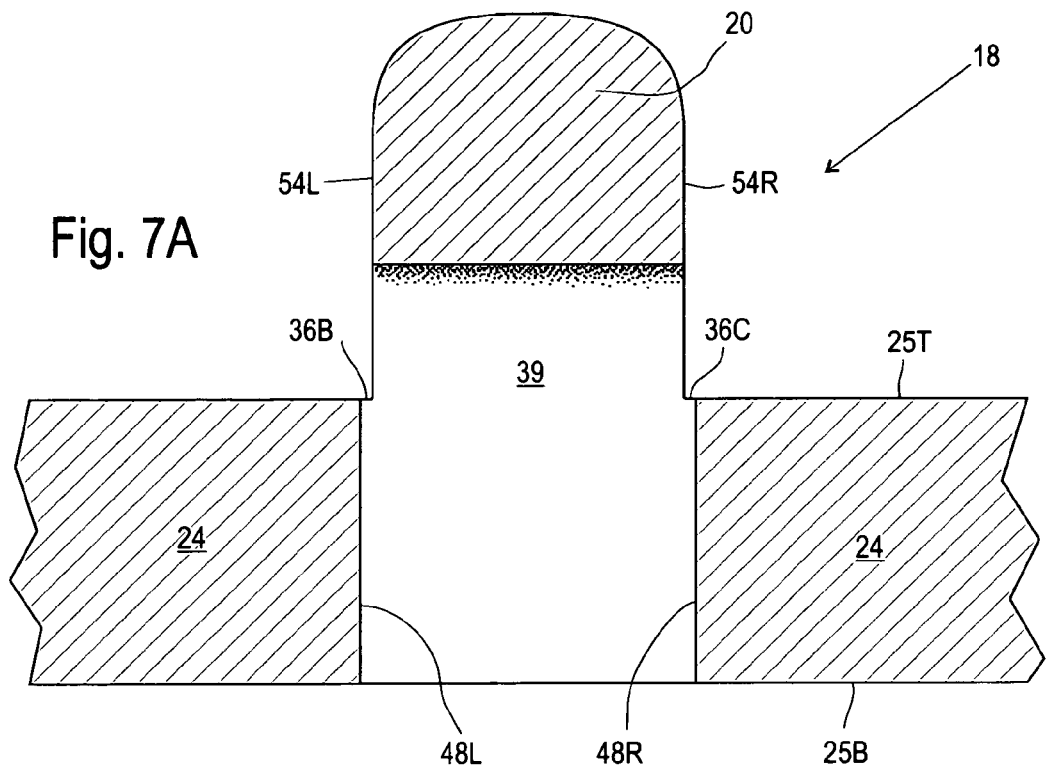

FIG. 7A shows a sectional view of FIG. 1A. In FIG. 7A, it can be seen that the right and left sides 48R and 48L of void 26 are perpendicular to surfaces 25T and 25B. It can also be seen that the right and left lateral surfaces 54R and 54L of arch 20 are perpendicular to surfaces 25T and 25B.

FIG. 3A (top view) and FIG. 6A (sectional view of FIG. 1A) show an important feature of male connector 18. From both of these viewpoints, male connector 18 has mirror symmetry. Therefore, in cases where a component of male connector 18 is not visible, that component can be assumed to be the mirror image of its visible counterpart.

FIG. 1A can be used to explain the correct orientation of male connector 18 on a construction module's surface. Whenever surface 25T slopes, relative to the direction of mold pull of the mold that creates it, the length of male connector 18 must parallel that slope. This orientation insures the moldability of male connector 18 with a straight-pull mold.

Figure 1B:
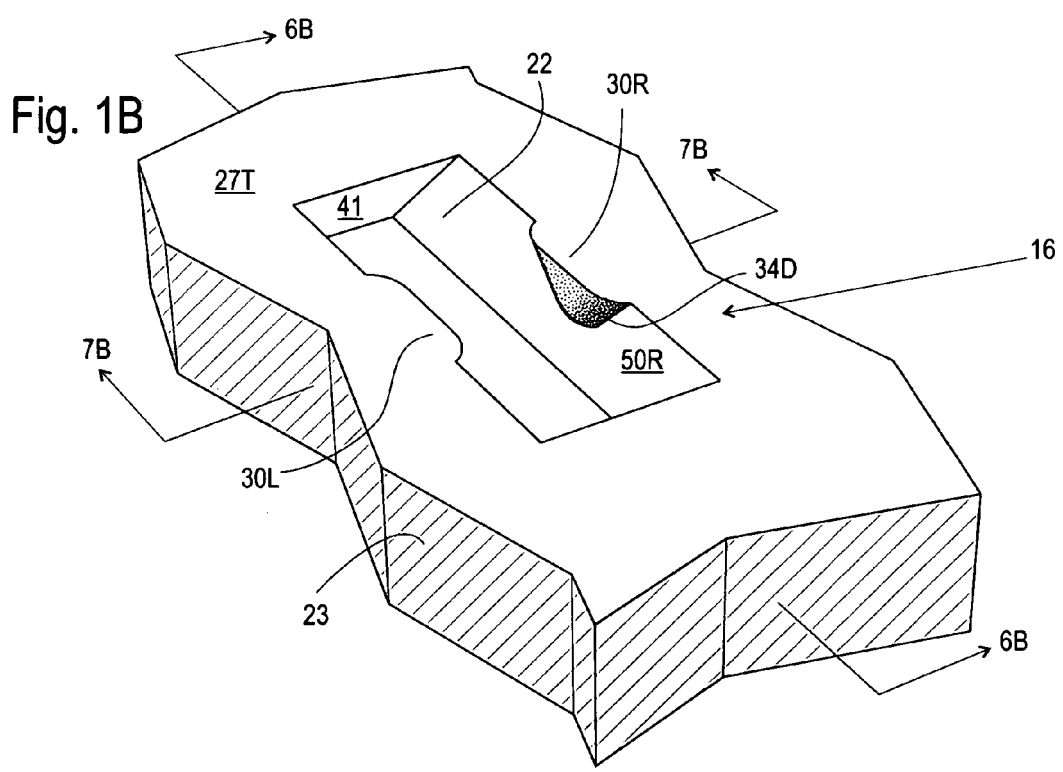

FIG. 1B (top perspective view), FIG. 2B (bottom perspective view), and 4B (bottom view) show a female connector or snap 16 and its components. Female connector 16 and its components are incorporated into a plastic wall 23 which has parallel top and bottom surfaces 27T and 27B, respectively. Female connector 16 includes a slot, recess, or hole 22, as well as two projections or bumps 30L and 30R that extend inward from the sides of slot 22. Projections 30L and 30R of the female connector 16 have rounded and curved downward-facing edges 34A, 34B, 34C, and 34D, which can be easily seen in FIG. 4B (bottom view).

Figure 7B:
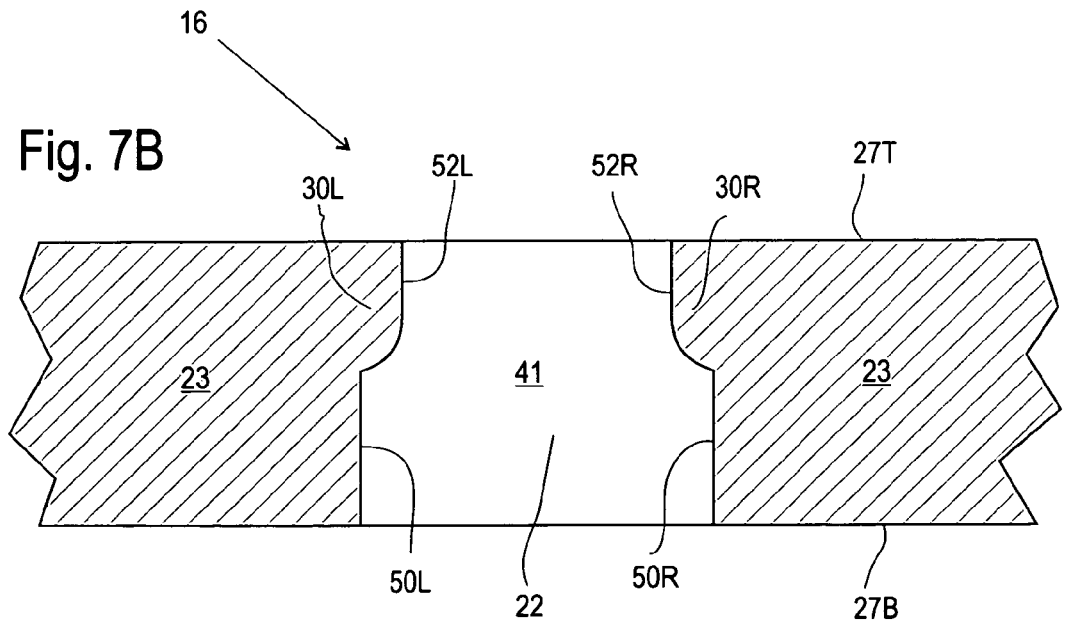

In FIG. 7B (sectional view of FIG. 1B), it can be seen that the right and left boundary surfaces 50R and 50L of slot 22 are perpendicular to surfaces 25T and 25B. It can also be seen in FIG. 7B that surfaces 52R and 52L of projections 30R and 30L are perpendicular to surfaces 25T and 25B.

Figure 6B:
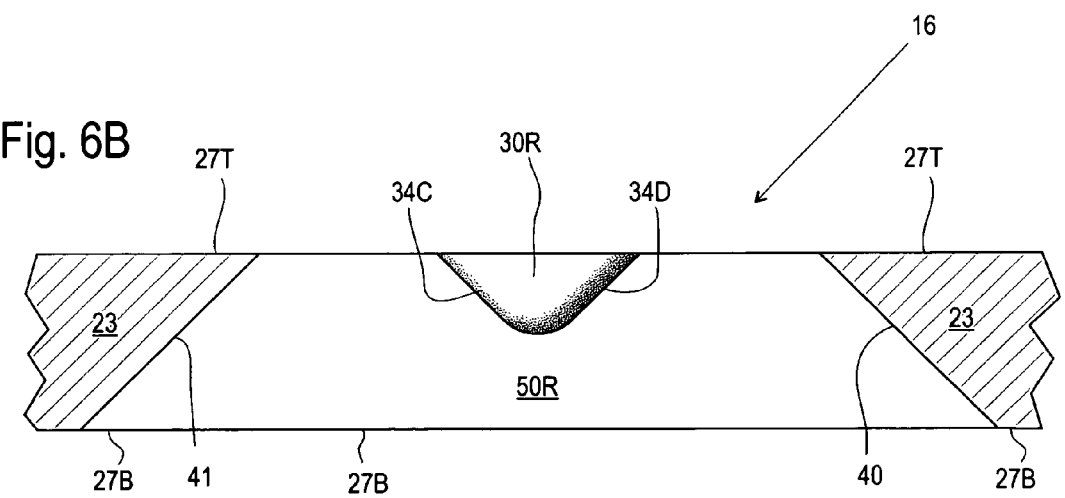

FIG. 3B (top view) and FIG. 6B (sectional view of FIG. 1B) show an important feature of female connector 16. As with male connector 18, female connector 16 has mirror symmetry from both of these perspectives. In cases where a component of female connector 16 is not visible, it can be assumed to be the mirror image of its visible counterpart.

FIG. 1B can be used to explain the correct orientation of female connector 16 on a construction module's surface. Whenever surface 27T slopes, relative to the direction of mold pull of the mold that creates it, the length of female connector 16 must parallel that slope. This orientation insures moldability of female connector 16 with a straight-pull mold.

DETAILED DESCRIPTION

Preferred Embodiment—Angles and Proportions

Although the absolute dimensions of a male connector 18 and a female connector 16 can vary somewhat, they are a cooperating pair, so they must maintain some essential proportions relative to one another. FIGS. 3A (top view) and 3B (top view) are helpful in understanding some of the relative dimensions of male connector 18 (FIG. 3A) and female connector 16 (FIG. 3B). The width of arch 20, measured between lateral surfaces 54L and 54R, is narrower than the widest span of slot 22. However, the width of arch 20 is wider than the span between projections 30L and 30R of the female connector 16. The lengths of arch 20 and slot 22 are equal. As shown in FIGS. 6A and 6B (sectional views of FIGS. 1A and 1B, respectively), projection 30R (FIG. 6B) is of roughly the same shape as opening 28R (FIG. 6A). Though it may not be apparent, from this perspective, projection 30R is also slightly smaller than opening 28R.

While the absolute dimensions of this preferred embodiment are somewhat arbitrary, and therefore less important than its relative dimensions, they may, nonetheless, be helpful in more fully understanding the advantages of this preferred embodiment. FIGS. 1A and 1B can be used to understand the scale of this preferred embodiment. The thickness of walls 24 (FIG. 1A) and 23 (FIG. 1B) are both 1.8 mm. The length and width of arch 20 (FIG. 1A) are 5.6 mm and 1.9 mm, respectively. The height of arch 20, measured perpendicularly from the plane occupied by surface 25T, is 2.4 mm. The width of slot 22 (FIG. 1B) is 2.2 mm at its widest point, and its length is 5.6 mm. The span between projections 30L and 30R is 1.7 mm.

The male and female connectors of this preferred embodiment are designed in such a way as to be free of undercuts, even when they are injection molded at a variety of angles by a straight-pull mold [See inset "MOLDING TERMS" section on pages 3 and 4 of this specification for explanation and clarification of italicized terms, if necessary]. It is this guiding principle, more than the precise angles shown in the figures, that best defines their design. Many of the angles of these connectors are variable to some degree, as long as they remain free of undercuts. The following paragraphs, however, will serve as concrete illustrations of the connector features that were derived from this guiding principle. While some important angles are fixed, and can be described in degrees, others are variable. The manner in which those variable angles can vary will be explained using diagrams.

FIGS. 6A and 6B can be used to explain some important fixed angles of my connectors. As shown in FIG. 6A (sectional view of FIG. 1A), surfaces 32A and 32B of arch 20 are inclined at 90° angles to one another, and at 45° angles to surfaces 25T and 25B. FIG. 6A also shows downward-facing surfaces 38 and 39, which represent the upper boundary of void 26 and the underside of arch 20. In the preferred embodiment, the portions of surfaces 38 and 39 that lie above the plane occupied by surface 25T are inclined at 90° angles to one another, and at 45° angles to surfaces 25T and 25B. FIG. 6B (sectional view of FIG. 1B) shows that edges 34D and 34C of projection 30R are also inclined at 90° angles to one another, and at 45° angles to surfaces 25T and 25B.

DETAILED DESCRIPTION

Preferred Embodiment—Variable Components

Surfaces 40 and 41 (FIG. 6B), and portions of surfaces 38 and 39 (FIG. 6A) may preferably display variation when incorporated into some of the unique environments of a multi-faceted construction module. In FIGS. 6A and 6B, surfaces 38, 39, 40, and 41 are depicted in just one possible configuration. FIGS. 8D and 8E illustrate several acceptable alternatives to the inclinations of surfaces 38, 39, 40, and 41 (from FIGS. 6A and 6B).

FIGS. 8D and 8E show how, in the course of designing one construction module, it might be useful and acceptable to incorporate slightly altered connectors in certain locations. FIG. 8D is a perspective view of an alternative plastic part 72 with several incorporated connectors whose contours vary from those shown in FIGS. 1A, 1B, 1C, and 1D. In FIG. 8E (sectional view of FIG. 8D), arrows indicate the direction of mold pull that would be used if plastic part 72 were molded. It is apparent in FIG. 8E that, despite its connectors' geometric variation, plastic part 72 is free of undercuts and, therefore, can still be molded by a straight-pull mold.

This demonstrates that surfaces 40 and 41 (from FIG. 6B) are not restricted to one angle of inclination. In FIG. 8E, their flexibility is reflected in the variation of surfaces 40A, 40B, 40C, 41A, 41B, and 41C. FIG. 8F also demonstrates the manner in which the portions of surfaces 38 and 39 (from FIG. 6A) can vary. Please notice that variation only occurs in portions of surfaces 38 and 39 (from FIG. 6A) that lie between the planes occupied by surfaces 25T and 25B. That variety is reflected in FIG. 8F by surfaces 38A, 38B, 38C, 39A, 39B, and 39C. The flexibility offered by these alternative connector geometries could serve many purposes. Varying the connectors' surface inclinations might, for example, facilitate machining of the mold from which the connectors are created, or it might serve to strengthen the plastic part into which the connectors are incorporated.

OPERATION

Figure 8A:
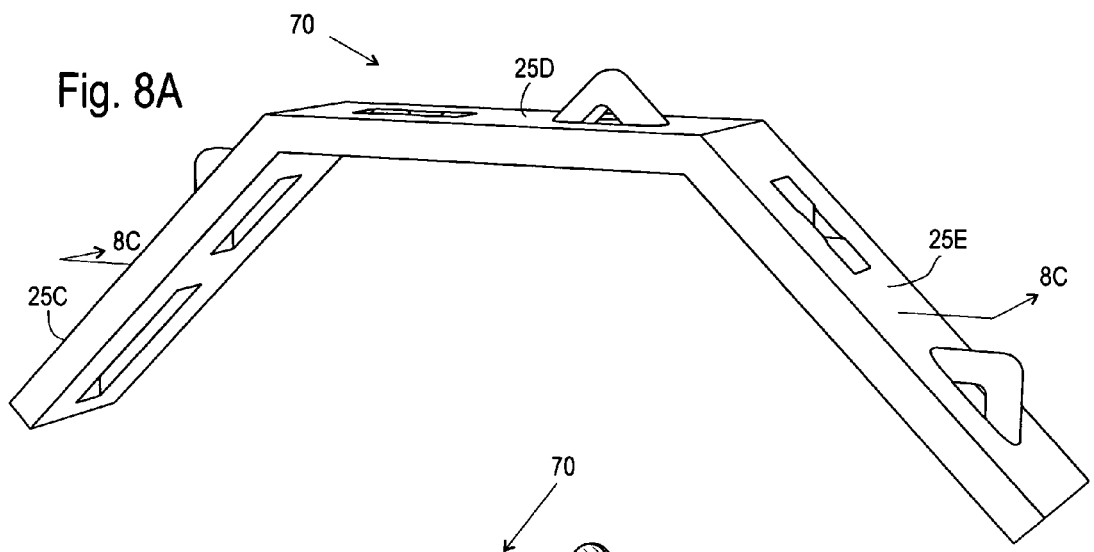
FIGS. 8A to 8C show the connectors incorporated into surfaces of varied inclinations.
Figure 8B:
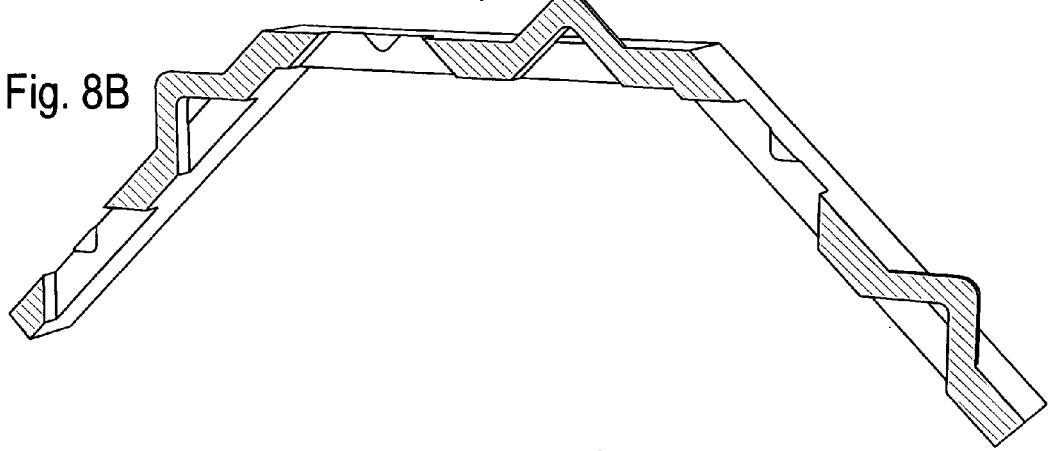
Figure 8C:
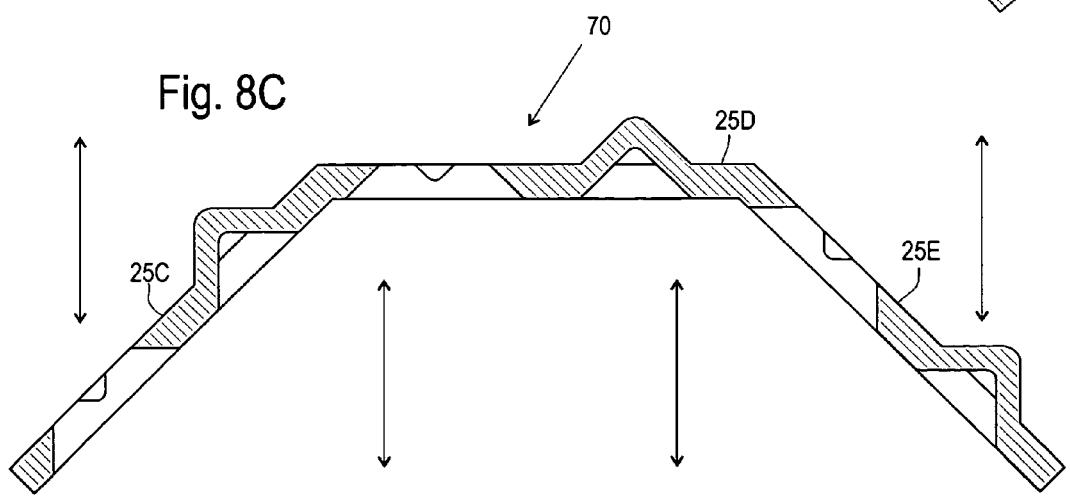
Figure 9A:
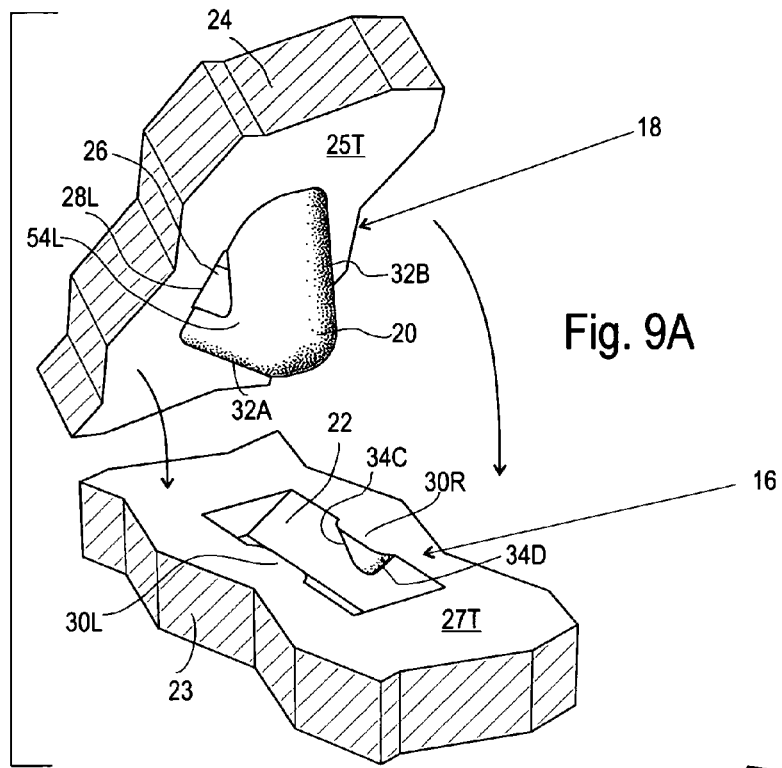
FIGS. 9A to 9F show a heterosexual pair of connectors and demonstrate their engagement.
Figure 9B:
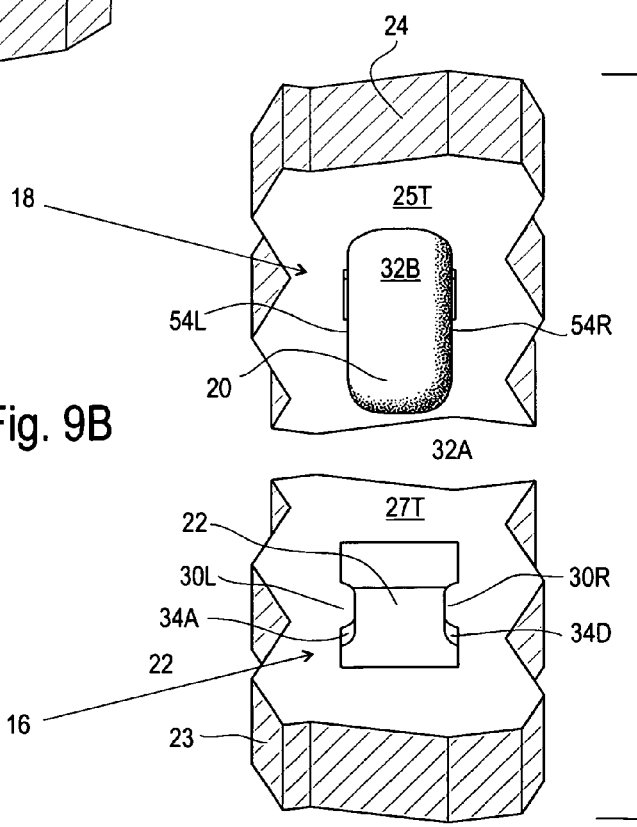

Preferred Embodiment—FIGS. 8A-8C, 9A-9Z, 10B-10E, 11E-11G Operation Preferred Embodiment—Engagement of Connectors The end-user function of my connectors is to connect modules. FIGS. 9A and 9B are perspective views that can be used to understand how male connector 18 and female connector 16 engage to form a snap-fit connection. The connectors engage via the insertion of arch 20 into slot 22. Arrows (FIG. 9A) indicate a direction in which male connector 18 might move in order to engage with female connector 16. During the entry of arch 20 into slot 22, surfaces 32A, 32B, 54L, and 54R of the arch 20 interfere with projections 30R and 30L. This is because arch 20 is wider than the span between projections 30R and 30L. After a moment of interference and deformation of both arch 20 and projections 30R and 30L, lateral surfaces 54L and 54R slide past projections 30R and 30L.

Figure 9C:
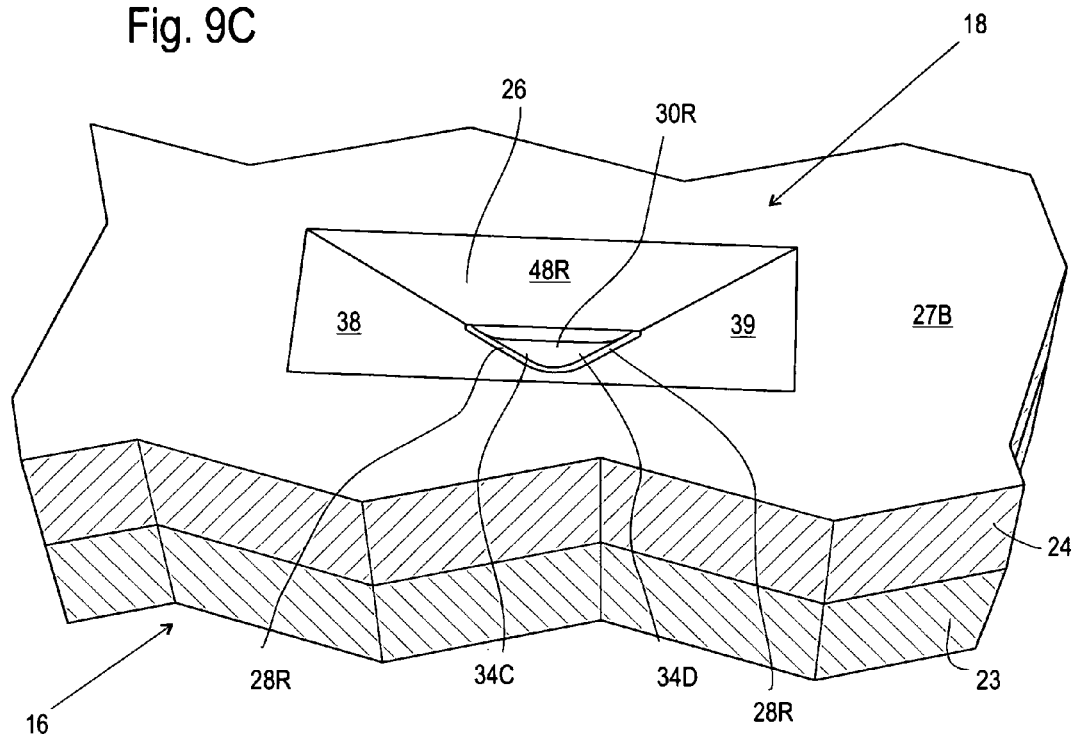
Figure 9D:
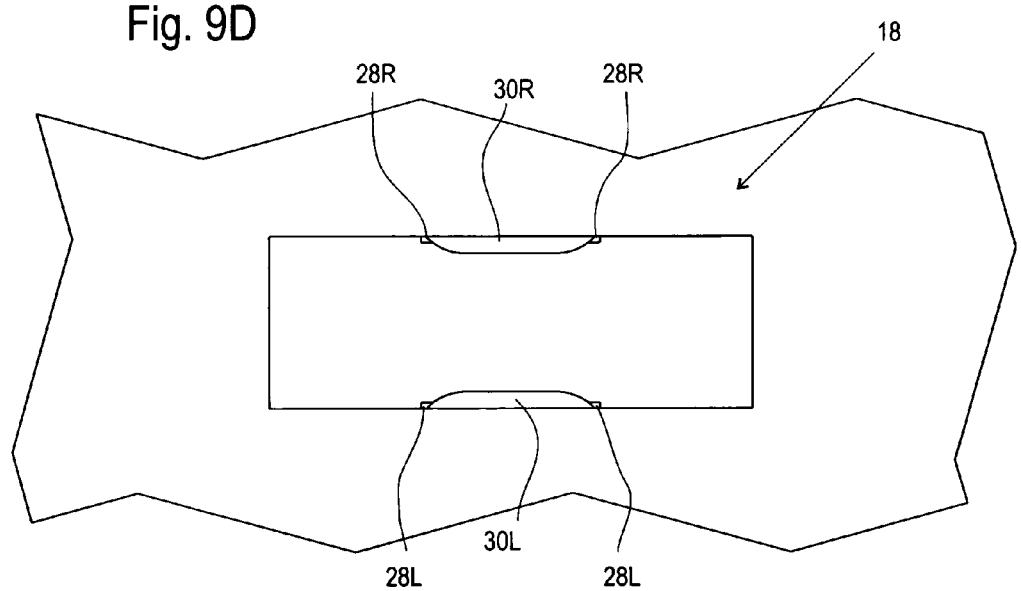

FIG. 9C is a top perspective view showing male connector 18 (on top) and female connector 16 (beneath) in full engagement. FIG. 9D is an orthogonal (top) view of the same engaged configuration. Only the projections 30R and 30L of the female connector 16 are visible in FIG. 9D. FIGS. 9C and 9D show that, after engagement, projections 30R and 30L become seated in the openings 28R and 28L of void 26. Once projections 30R and 30L become seated in openings 28R and 28L, there is no longer interference, and all of the momentarily deformed materials resile. The resilience of projections 30R and 30L, once they become seated in openings 28R and 28L, serves to anchor arch 20 inside slot 22.

Figure 9E:
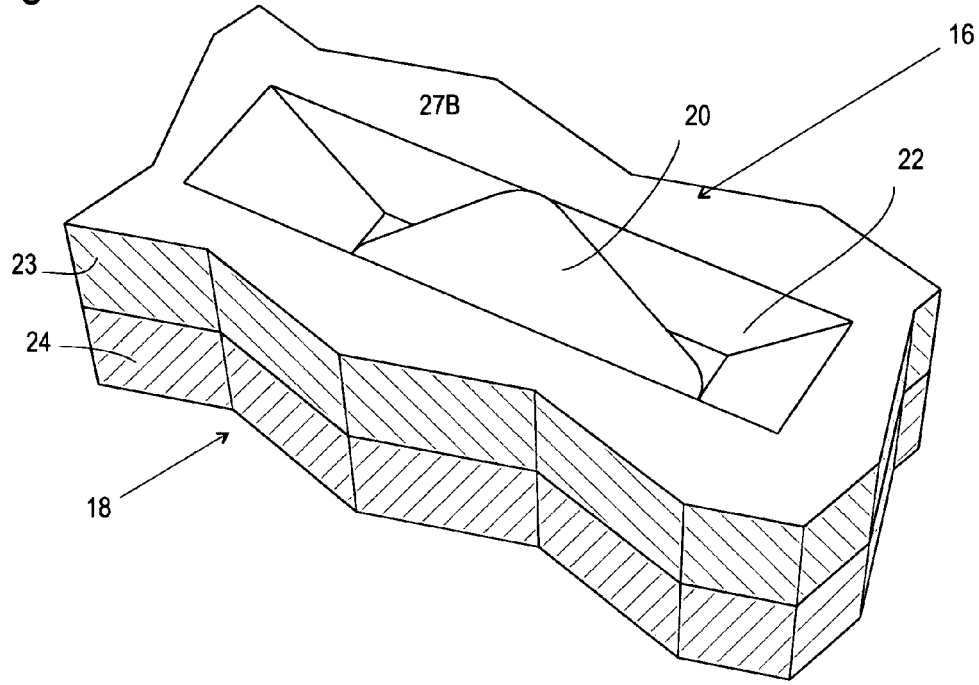

FIG. 9E (bottom perspective view of FIGS. 9C and 9D) provides a clearer view of fully engaged arch 20, as it protrudes through slot 22. Since there is no interference or deformation once arch 20 is anchored in slot 22, my connectors can remain connected for long periods of time without suffering any deleterious loosening of their bond. Also, since the period of interference is brief, the amount of effort required to engage and disengage male connector 18 and connector 16 remains reasonable even when tooling inaccuracy results in a span between projections 30R and 30L that is slightly too narrow. In contrast, friction-fit connectors that are slightly too tight can be extremely difficult to engage and disengage, because they require a sustained force throughout their entire engagement process.

The rounded edges of surfaces 32A and 32B (FIGS. 9A and 9B) of the arch 20 assist in properly seating the arch 20 in slot 22. Those round edges of surfaces 32A and 32B also provide a wedging mechanical advantage for pushing past the projections 30R and 30L.

Arch 20 can be disconnected from slot 22 in a process that is simply the reverse of the interference, deformation, and resilience that take place during engagement. FIGS. 9A, 9B, and 9C show that the rounding of edges 34A, 34C, and 34D of projections 30R and 30L can assist in the disengagement of arch 20 from slot 22. The rounding of edges 34A, 34B, 34C, and 34D assists in disengagement both by guiding arch 20 to the center of the slot 22 and by providing a mechanical advantage for pushing past projections 30R and 30L.

OPERATION

Preferred Embodiment—Benefits of "Play"

Figure 9F:
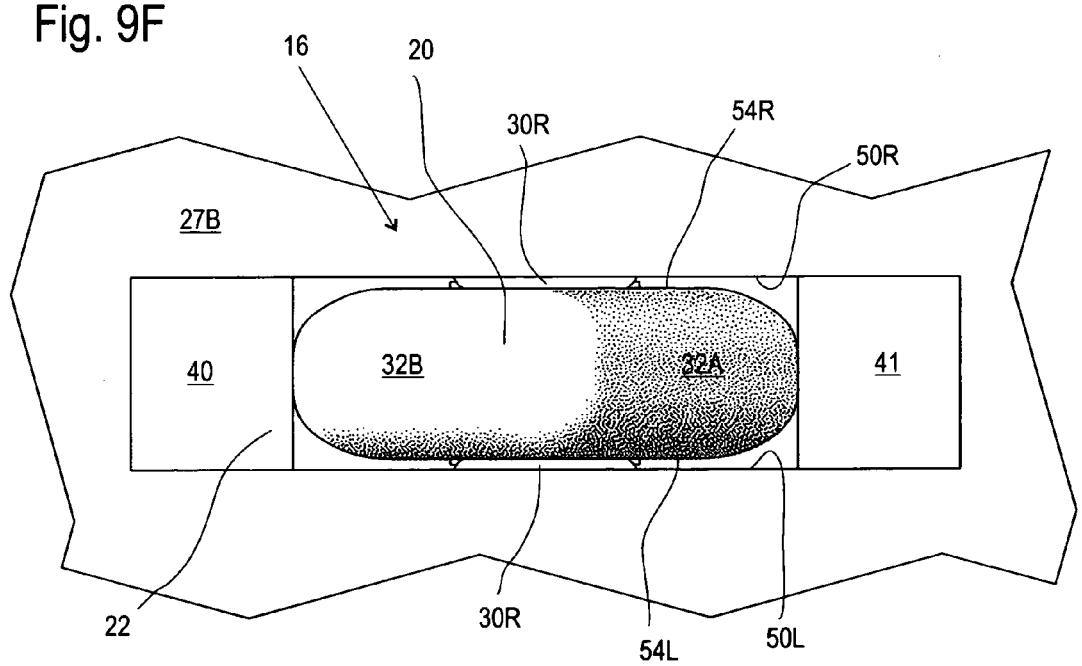

FIGS. 9E (bottom perspective view of FIG. 9C) and 9F (bottom view of FIG. 9C) show male connector 18 in engagement with female connector 16. In both figures, the only salient portion of male connector 18 is its arch 20. In the figures, arch 20 is seated in slot 22. In FIG. 9E, arch 20 of the male connector 18 is seen protruding through plastic wall 23, via slot 22. You can see in FIG. 9F that there is some lateral "play" between lateral surfaces 54L and 54R of arch 20 and the boundary surfaces 50L and 50R, respectively, of slot 22. This means that, once engaged, a pair of male and female connectors can be wiggled a little bit in a lateral direction without encountering interference.

In FIG. 9C (top perspective view), you can see that there is also some vertical (perpendicular to surface 27B) "play" between surfaces 38 and 39 of male connector 18 and the edges 34C and 34D of projection 30R. This means that the male and female connectors, once engaged, can be wiggled a little bit in the vertical direction without encountering interference or beginning the process of disengagement. Both vertical and lateral "play" are augmented by the rounding of edges 34C and 34D of projection 30R, as well as their mirror image counterparts 34A and 34B of projection 30L.

Both lateral and vertical play are also important because they compensate for inaccuracies in the manufacturing process. Even when the geometries of corresponding male and female connectors fluctuate to a minor degree, there is enough play in the connection so that the surfaces of engaged male and female connectors do not interfere with one another.

Another advantageous function of this vertical "play" (visible in FIG. 9C) in engaging connectors is that it causes a "snap" to be produced upon completion of the connectors' engagement. FIGS. 9A and 9B are useful in illustrating how this works. During engagement, a certain amount of force is required to push the connectors into and through a zone of interference where projections 30R and 30L interfere with lateral surfaces 54R and 54L. However, as soon as that zone of interference is passed, the connectors enter the zone of "play." In this zone of play, there is no interference and, therefore, no resistance. As soon as this zone of play is entered, the force that had been necessary to push past the zone of interference is now sufficient to accelerate the connectors, as well as the surfaces 25T and 27T to which they are attached, toward one another. This acceleration allows surfaces 25T and 27T to hit one another at a fast enough speed to create a concussion or "snap." The snap can usually be felt as well as heard, and it provides a satisfying indicator that the connectors have been successfully engaged.

OPERATION

Preferred Embodiment—Self-Adjustment

FIGS. 9A-9D are also useful for understanding another important aspect of my connectors' operation. During use, my connectors self-adjust their requisite snapping and unsnapping forces to an appropriate level. As described above, when a arch 20 enters a slot 22, projections 30R and 30L briefly deform and then resile, becoming seated in openings 28R and 28L, and anchoring arch 20 in slot 22. In addition to the temporary deformation and resilience referred to above, when connectors are first engaged and disengaged, there is also some permanent deformation of projections 30R and 30L, and, to a lesser extent, of arch 20. This permanent deformation increases the distance between the projections 30R and 30L, and thus reduces, thereafter, the interference that takes place between projections 30R and 30L and arch 20 upon engagement and disengagement. In turn, this reduction of interference reduces the amount of force that is required to engage and disengage male connector 18 and female connector 16. As male connector 18 and female connector 16 undergo several cycles of engagement and disengagement, the magnitude of permanent deformation occurring with each cycle decreases in such a way that the distance between 30R and 30L quickly approaches an equilibrium value. Accordingly, the during this "breaking-in" period of several snapping cycles, the requisite snapping and unsnapping forces also approach equilibrium. Fortunately, the equilibrium value for the distance between 30R and 30L, after a breaking-in period, results in an appropriately strong requisite force for snapping and unsnapping male connector 18 and female connector 16. It is also fortunate that the equilibrium values for requisite engagement and disengagement forces, after a "break-in" period, are fairly constant, regardless of their starting values. These equilibrium value seems to be a property of the plastic resin used to mold the connectors. In the case of the preferred embodiment, that resin is ABS.

The self-adjustment of my connectors is particularly advantageous in situations where the distance between 30R and 30L has accidentally been made too small by the manufacturer. In those cases, projections 30R and 30L that project too far are simply sheared or smeared down to an equilibrium value at a faster rate than appropriately machined projections. After the break-in period, all of the connectors of a multi-faceted module have requisite snapping and unsnapping forces that are fairly homogeneous and appropriate, even if those forces were initially varied in magnitude due to dimensional imprecision of their mold.

OPERATION

Preferred Embodiment—Engagement at Multiple Angles

Figure 9G:
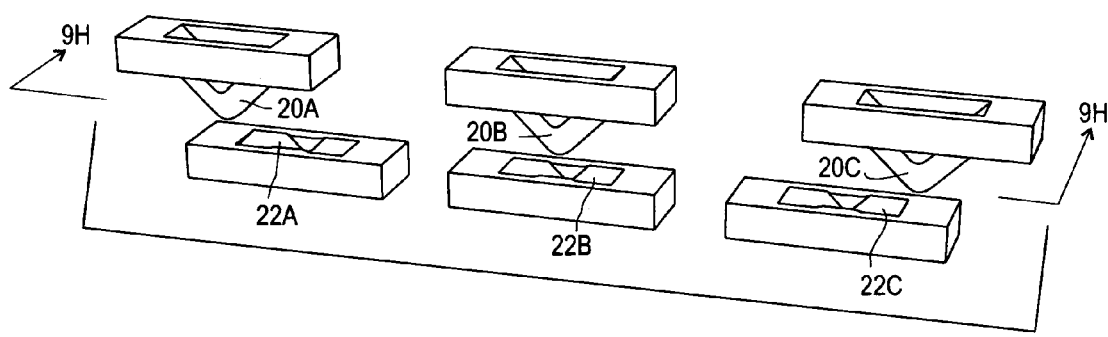
FIGS. 9G and 9H show three pairs of connectors preparing to engage at differing angles.
Figure 9H:
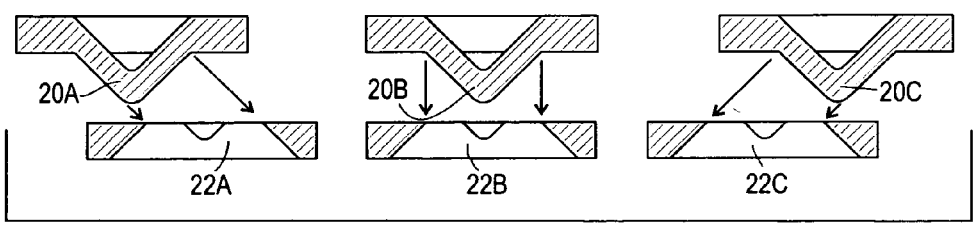

An important aspect of my connectors operation is their ability to engage one another from a variety of angles. This is demonstrated in FIGS. 9G (top perspective view) and 9H (sectional view of FIG. 9G). In the figures, three pairs of connectors are shown poised for engagement at three different angles of approach. The angles of approach, which are indicated by arrows in FIG. 9H, vary from 45° to −45°. It is apparent in this diagram that arches 20A, 20B, and 20C can engage with slots 22A, 22B, and 22C, respectively, at any of these angles, and at any angles in between. It is the taper of my connectors, from this perspective, that allows them to engage at many angles. This capability is in stark contrast with typical non-tapering, stud-type connectors, which can only engage at one angle.

Figure 9I:
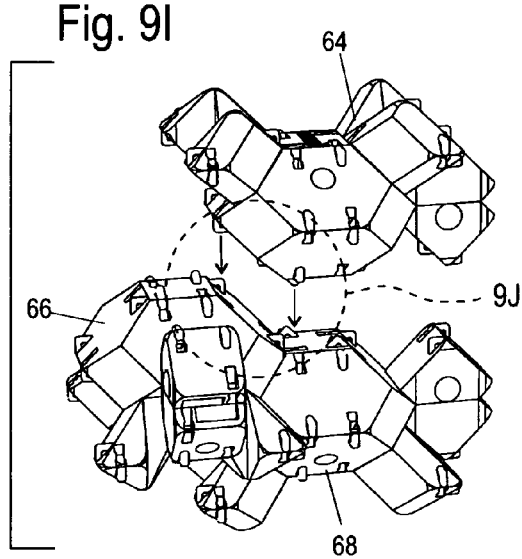
FIGS. 9I to 9K show three turtle modules, incorporating my connectors, making multiple connections at varying angles.
Figure 9J:
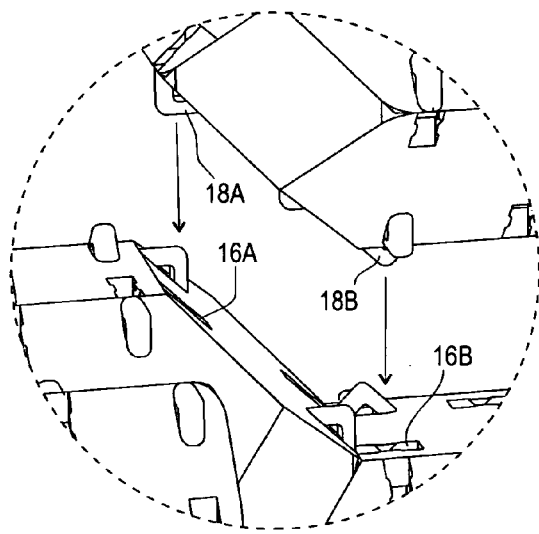
Figure 9K:
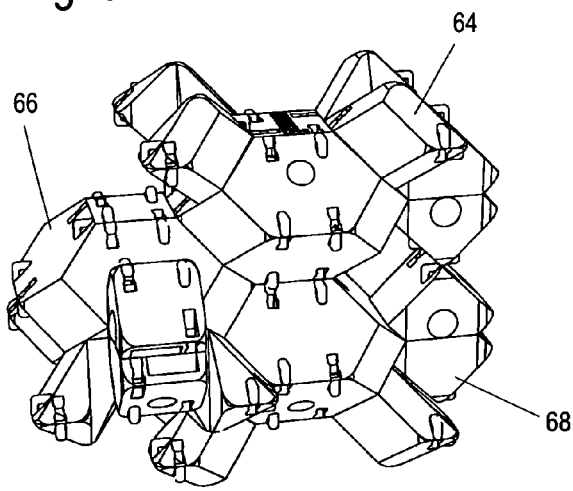

FIGS. 9I, 9J, and 9K illustrate a critical function of my connectors' variable angle of approach. FIG. 9K (perspective view) is an example of a multi-faceted construction module structure that could not be constructed if the modules' connectors could not engage at multiple angles. FIGS. 9I and 9K show how my connectors' ability to engage at multiple angles facilitates the construction of this structure. FIG. 9I is a perspective view of three turtle-shaped multi-faceted construction modules, each of which incorporates a plurality of my connectors. In the figure, turtle modules 66 and 68 have already been connected, and turtle module 64 is poised for connection. FIG. 9K is an enlarged view of FIG. 9I. In FIGS. 9I and 9K, arrows indicate the direction in which male connectors 18A and 18B will move in order to engage with female connectors 16A and 16B, respectively. Please notice that male connector 18A is approaching at a 45° angle, relative to the surface in which female connector 16A is incorporated. Meanwhile, male connector 18B is approaching at a 90° angle, relative to the surface in which female connector 16B is incorporated. While there are clearly other connectors involved in the module connection depicted in FIGS. 9I, 9J, and 9K, these examples are illustrative of the critical function served by my connectors' ability to engage at many angles. The configuration shown in FIG. 9K is just one example of a wide array of module structure configurations that would not be possible to construct if it were not for my connectors' ability to engage at a variety of angles.

Another important function of my connectors' variable angle of engagement is that it simply offers more engagement options to the user, some of which maybe physically easier than others. For instance, if it is easier for a user to push together two construction modules in a lateral direction, rather than in a vertical direction, the user has the option of choosing the easier direction.

OPERATION

Preferred Embodiment—Beneficial Synergy Between Variable Angles of Engagement and "Play"

Figure 9L:
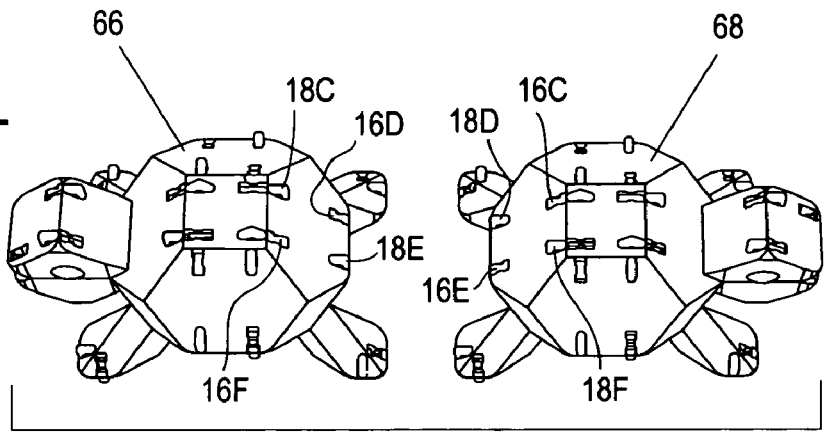
FIGS. 9L to 9N show two turtle modules, incorporating my connectors, demonstrating their connectors' ability to engage "piecemeal."
Figure 9M:
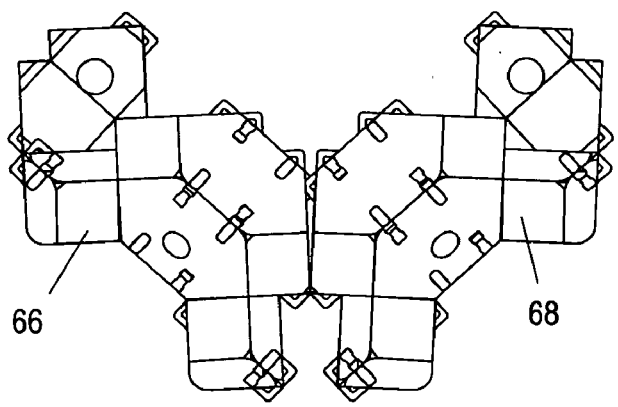
Figure 9N:
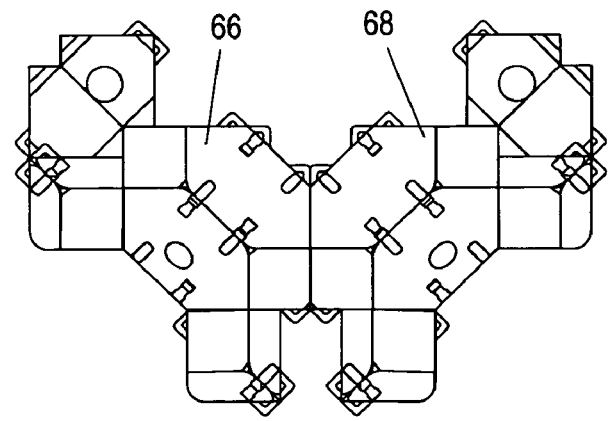

My connectors' variable angle of approach performs several more important functions by working in concert with the "play" afforded by my connectors' snap fit. FIGS. 9L, 9M, and 9N demonstrate one such function. These figures show the ability of two planar arrays of my connectors to be snapped together "piecemeal." FIG. 9L is a perspective view of two turtle modules 66 and 68 that are poised to be connected back-to-back. The "back" of turtle module 66 comprises the first planar array of connectors, which includes male connectors 18C and 18E and female connectors 16D and 16F. The "back" back of turtle module 68 comprises the second planar array of connectors, which includes male connectors 18D and 18F and female connectors 16C and 16E. FIG. 9M (orthogonal view) shows the first step of this "piecemeal" connection process. In FIG. 9M, male connectors 18E and 18D (visible in FIG. 9L) have been engaged with female connectors 16E and 16D, respectively. FIG. 9M shows that the "play" afforded by my connectors' snap fit makes it possible for some, but not all, connectors in a planar array to be snapped to an adjacent figure. FIG. 9N shows the final engagement of turtle modules 66 and 68, after remaining male connectors 18C and 18F (visible in FIG. 9L) have engaged with the remaining female connectors 16C and 16F.

The possibility of piecemeal engagement, such as this, is advantageous for two reasons. First, it can be quite difficult to snap a large array of connecting pairs together simultaneously. Rather than pressing together, for example, four pairs of connectors, four at a time, it is much easier to press them together two at a time. A second reason that the possibility of piecemeal engagement is advantageous is that it can simplify the act of aligning connectors for engagement. When fewer connectors must be aligned for connection at one time, aligning those connectors can be easier. The fact that a planar array of my connectors may be snapped together piecemeal represents a significant advantage over many non-tapering connectors, planar arrays of which must always be engaged simultaneously and equally.

Figure 9P:
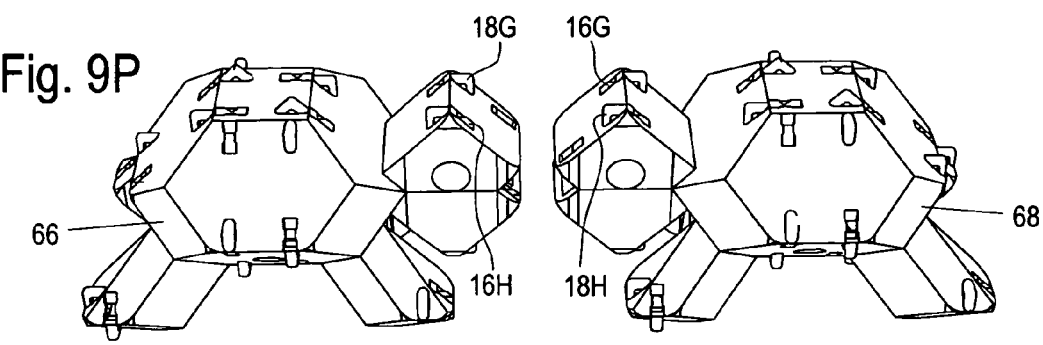
FIGS. 9P to 9Q show two turtle modules demonstrating their connectors' "play."
Figure 9Q:
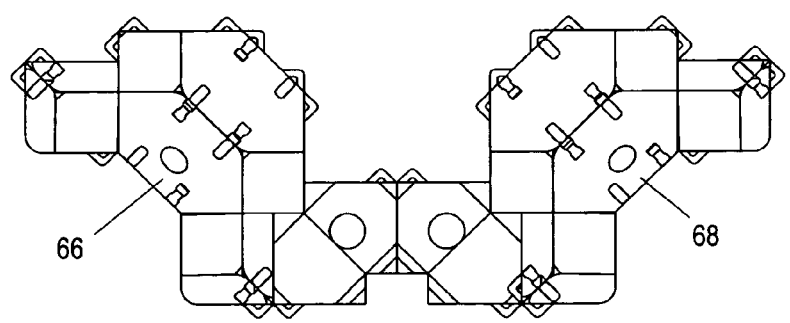
Figure 9R:
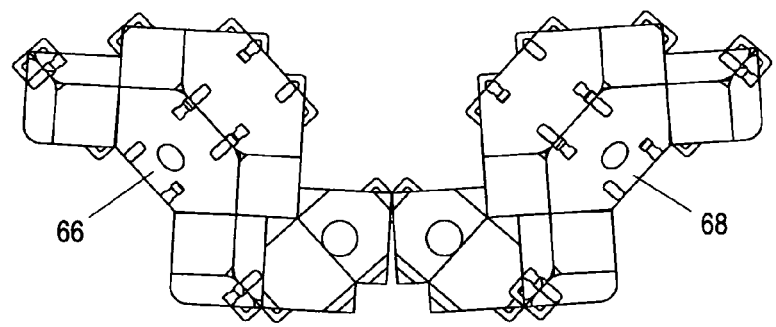
FIGS. 9S and 9T show four turtle modules demonstrating their connectors' ability to compensate for the geometric flaws of the turtle modules pictured.
FIGS. 9U to 9W show the top and bottom halves of a molded turtle module incorporating a plurality of my connectors.
FIGS. 9X to 9Z show one of my male connectors and simplified versions of the mold portions that create that connector.
Figure 9S:
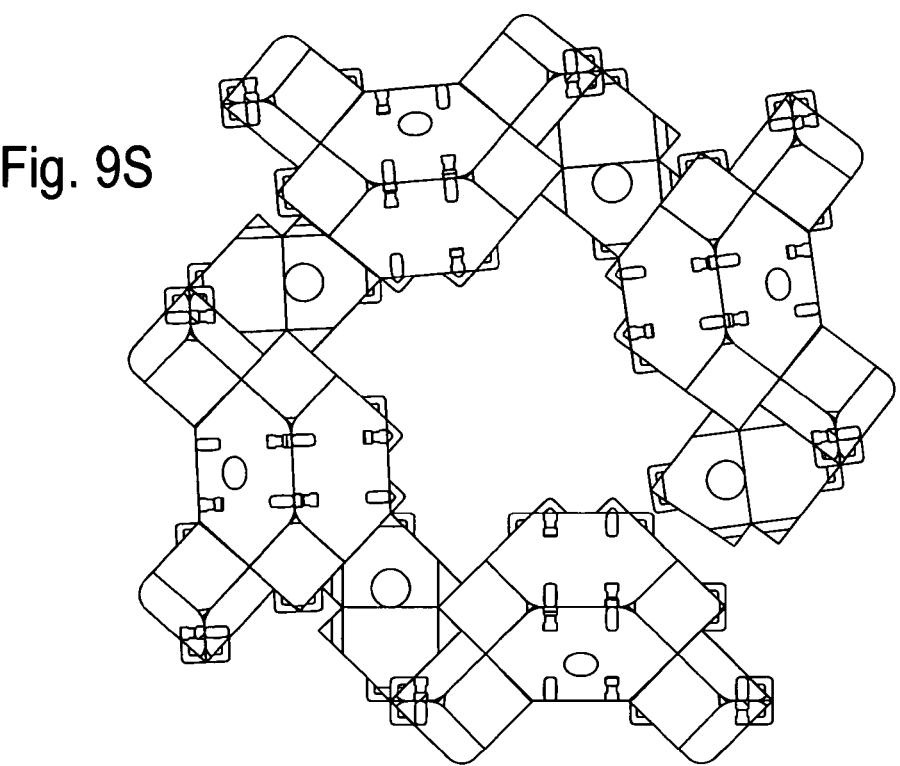
Figure 9T:
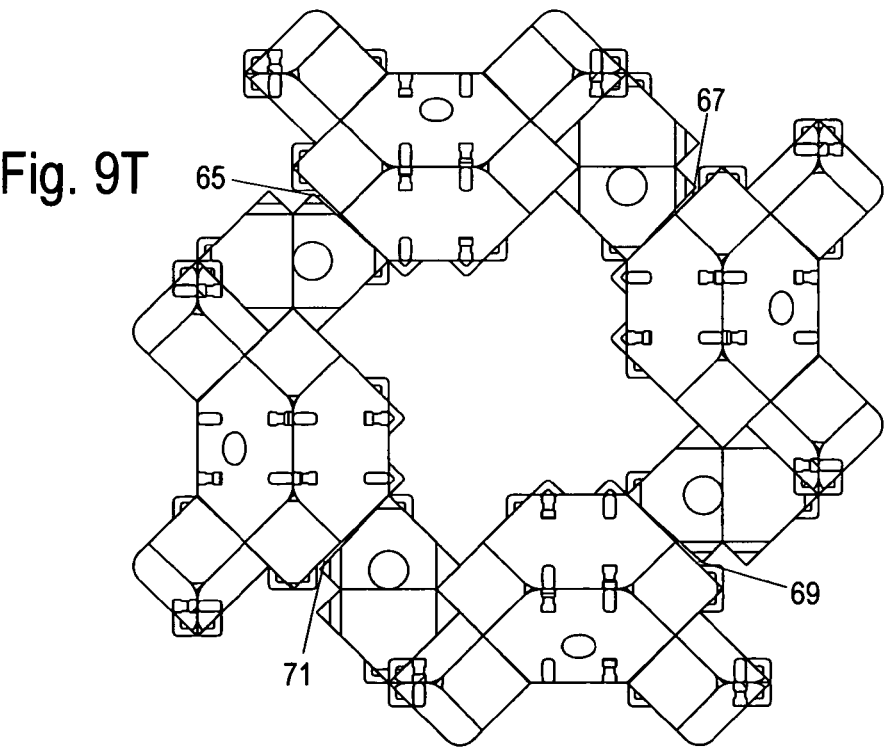

My connectors' "play" and variable angle of approach also function together to allow construction module structures to maintain their integrity when subjected to minor perturbations or module defects. FIG. 9P is a perspective view showing two turtle construction modules 66 and 68, their male connectors 18G and 18H, and their female connectors 16G and 16H. FIG. 9Q is an orthogonal view showing the same turtle toy modules 66 and 68 with male connectors 18G and 18H engaged with female connectors 16G and 16H in an unperturbed condition. FIG. 9R demonstrates an example of the extent to which toy modules 66 and 68 can be perturbed without disengaging their snap fit. Not only does this flexibility in fit serve to ameliorate the accidental perturbations that inevitably accompany the building of complex module structures, but it also compensates for dimensional inaccuracies in the construction modules, themselves. FIG. 9S shows an open "ring" of connected turtle modules that does not meet at the ends due to a slight dimensional inaccuracy of each turtle. FIG. 9T shows how the somewhat flexible engagements of my connectors can allow each connection to flex, allowing the ring from FIG. 9T to close in a satisfactory manner, even though each module is imperfect. Evidence of this flexibility is visible in spaces 65, 67, 69, and 71, which have opened up as the ring of modules has been closed.

OPERATION

Preferred Embodiment—Moldability with a Straight-Pull Mold

Up to this point, the operational aspects of this preferred embodiment that have been discussed have been related to its end use by consumers. In addition to its end user utility, the preferred embodiment of my connectors has carefully chosen design features that serve the purpose of prolonging the life and facilitating the creation of the mold from which it is formed.

One extremely important operational aspect of my connectors pertains to their ability to be molded with a straight-pull mold [See inset "MOLDING TERMS" section on page 3 for explanation and clarification of italicized terms, if necessary]. In FIGS. 8A (perspective view), 8B (sectional view of FIG. 8A), and 8C (sectional view of FIG. 8A), it can be seen that a plastic part 70 incorporating my connectors is free of undercuts and can therefore be molded with a straight-pull mold. This is true even though its surfaces 25C, 25D, and 25E are inclined to the direction of mold pull (shown by double-ended arrows in FIG. 8C) at a variety of angles between 45° and 90°. This in contrast with non-tapering connectors, such as those exemplified in FIGS. 11E (perspective view) and 11G (sectional view of FIG. 11F), which can only be easily molded at one angle. FIG. 9U provides a concrete example of this moldability. FIG. 9U is a top perspective view of the top component 72T and bottom component 72B of a multi-faceted turtle toy that has been successfully molded in plastic. Top component 72T and bottom component 72B fit together to form one complete toy turtle module. Please notice that a plurality of my connectors has been incorporated into the module's multiple surfaces. Those surfaces represent five different angles of inclination. FIG. 9V is a bottom perspective of the same turtle toy components 72T and 72B. Despite the apparent complexity of these turtle toy parts, they have no undercuts. They have been molded with a simple, straight-pull mold. FIG. 9W is a side view of both turtle toy components 72T and 72B. Arrows show the direction of pull of the mold that creates these turtle toy components. To the inventor's knowledge, the simultaneous straight-pull molding of so many identical snap-fit connectors into so many variously inclined surfaces represents a unique achievement.

OPERATION

Preferred Embodiment—Better, Easier Tooling

Figure 9X:
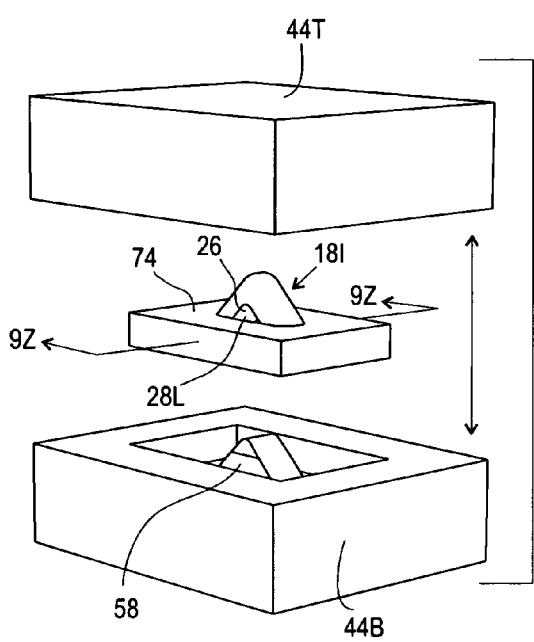
Figure 9Y:
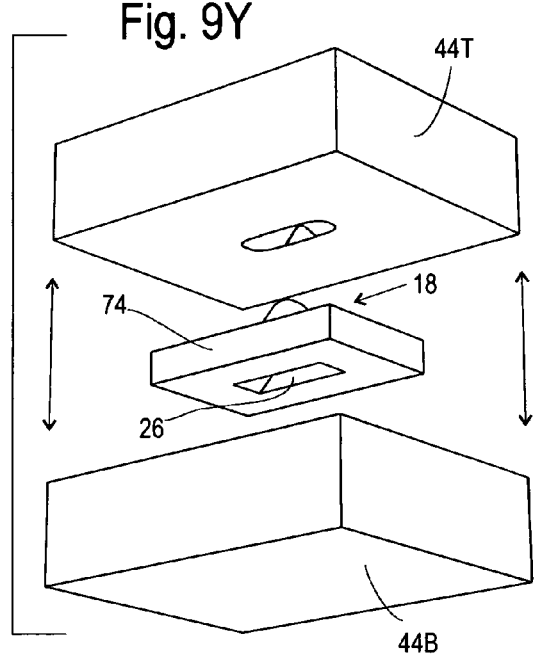
Figure 9Z:
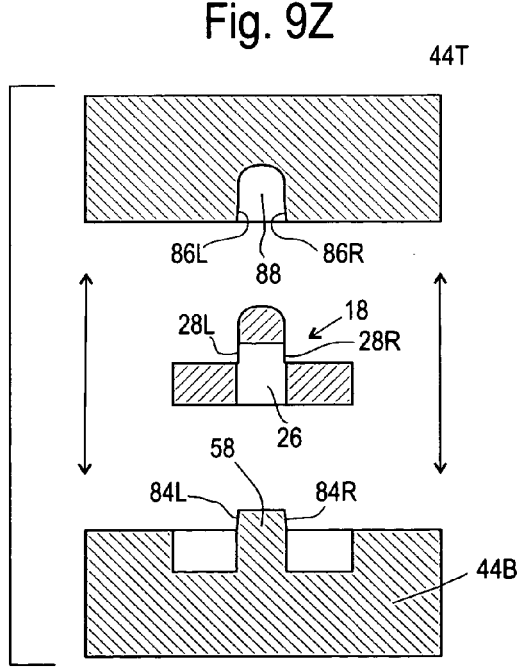

Employing void 26 (FIG. 9A) to anchor arch 20 in slot 22 is an innovation that prolongs mold life and facilitates tooling. FIGS. 9X, 9Y, and 9Z are helpful in understanding the function of this novel feature. FIG. 9X is a top perspective view showing an example plastic part 74 and the simplified mold halves that might create the part. In FIG. 9X, an arrow indicates the direction of pull for mold halves 44T and 44B. FIG. 9Y is a bottom perspective view of the same plastic part 74 and the same mold halves 44T and 44B. You can see in FIG. 9X that male connector 18 is designed in such a way that bottom mold half 44B has a large and sturdy core or projection 58. When mold halves 44T and 44B move together to create plastic part 74, core 58 is the portion of mold half 44B that forms void 26 (FIG. 9Y) and its openings 28L and 28R (FIG. 9Z, sectional view of FIG. 9X). The geometry of void 26 may be understood as the inverse of core 58. The sturdiness of core 58 endows the mold half 44B with an easier tooling process and a longer lifespan than a traditional snap-fit design would tolerate.

Figure 10A:
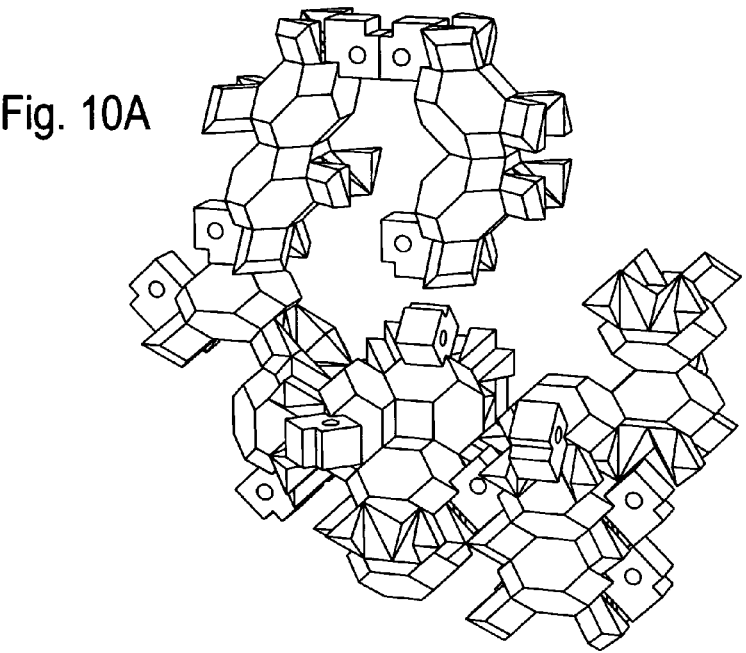
FIG. 10A shows a plurality of multi-faceted turtle modules forming a geometric structure.
Figure 10B:
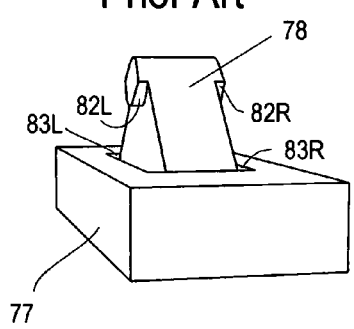
FIGS. 10B to 10D show a snap-fit male connector representative of the prior art, and a simplified version of the mold that might produce that connector.
Figure 10C:
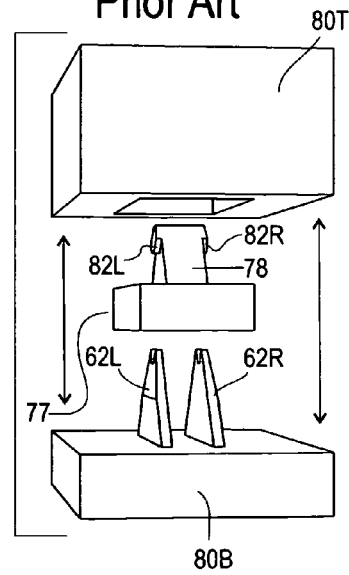
Figure 10D:
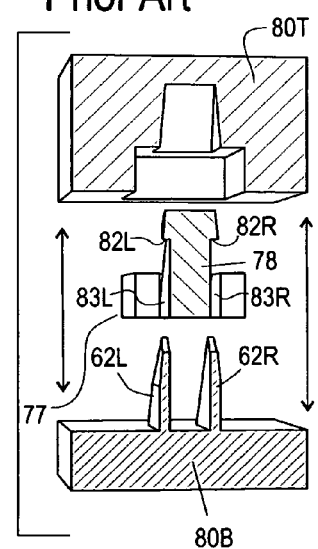

In contrast, FIGS. 10B, 10C, and 10D illustrate the molding implications of a traditional snap-fit member. A traditional male member, such as male member 78 (FIG. 10B, perspective view) relies on an enlarged "head" to anchor the male member in its corresponding female slot. FIG. 10B is a perspective view of male member 78 and the plastic part 77 into which it is incorporated. FIG. 10C is a perspective view of the same plastic part 77 and some mold halves 80T and 80B representative of the mold that would be used to create plastic part 77. FIG. 10D is a sectional view of FIG. 10C. In both FIG. 10C and FIG. 10D, arrows indicate the direction of mold pull. FIGS. 10C and 10D show that, in order to produce this male snap-fit member with a traditionally enlarged head, it is necessary to have two relatively flimsy cores 62L and 62R, whose purpose is to form the undercut surfaces 82L and 82R, respectively, of the enlarged portion of male member 78. It is also necessary for plastic part 77 to have cosmetically unappealing holes 83L and 83R (FIGS. 10B and 10D), through which cores 62L and 62R protrude to form surfaces 82L and 82R. Flimsy cores, such as cores 62L and 62R are difficult to machine and they are more susceptible to damage than sturdy cores. This is especially true at the small dimensions that are required for multi-faceted module connectors.

In order to avoid the problem of flimsy cores, one might thicken those cores, but the result of that thickening would be even larger and more unappealing holes 83L and 83R. When FIGS. 9X, 9Y, and 9Z are contrasted with and FIGS. 10B, 10C, and 10D, it is apparent that the utilization of a single void 26 (FIG. 9X) as an anchor, rather than the traditional enlarged head, represents a significant improvement over traditional snap-fit male member designs.

The shape of void 26 (FIG. 9X) and, therefore, the shape of core 58 (FIG. 9X) functions to prolong mold life in one more way. As you can see best in FIGS. 1A (top perspective view) and 3A (top view), the openings 28L and 28R to void 26 of this preferred embodiment are not quite planar. Openings 28L and 28R have short edges 36A, 36B, 36C, and 36D that extend away from the arch 20 at right angles. These "jogs" that are created by edges 36A, 36B, 36C, and 36D are not necessary for functionality of the connectors themselves. A arch 20 with entirely planar openings 28L and 28R, and no edges 36A, 36B, 36C, and 36D, would be just as effective. That "jog" simply allows features known as "telescoping shutoffs" to be incorporated into the mold that creates these parts, thereby extending the life of the mold.

A "shutoff" is an area where the metal of one mold half contacts the metal of another mold half, preventing any plastic part from forming. In FIG. 9Z (sectional view of FIG. 9X), it can be seen that surfaces 84R and 86R will contact one another, forming a shutoff, when mold halves 44T and 44B come together. In other words, surfaces 84R and 86R will make contact with one another through opening 28R when the mold is closed. Likewise, surfaces 84L and 86L will contact one another through opening 28L when the mold is closed. In FIG. 9Z, you can see that surfaces 84R, 84L, 86R, and 86L are not parallel to the direction of mold pull (indicated by arrows). Core 58 and the void 88, into whose opening core 58 inserts when the mold is closed, are both tapered. If surfaces 84R, 84L, 86R, and 86L were parallel to the direction of mold pull, they would shear or scrape against one another when the mold halves 44T and 44B closed and opened. That shearing or scraping would shorten the useful life of the mold. The contacts between surfaces 84R and 86R, and between 84L and 86L are called "telescoping" shutoffs, because core 58 and the void 88 both taper like a telescope.

DESCRIPTION

First Alternative Embodiments—FIGS. 12A, 6A, 6B

FIG. 12A is a perspective view showing three plastic parts 140, 142, and 144, which incorporate alternative embodiments of my male and female connectors. These examples of alternative embodiments show that my connectors might be redesigned by simply altering certain angles. This redesign might be warranted for construction modules whose surfaces are inclined at different angles to the direction of pull of the mold that creates them.

FIG. 6A (sectional view of FIG. 1A) shows surfaces 32A and 32B of male connector 18. In conjunction with the plane occupied by surface 25T, surfaces 32A and 32B should always parallel the sides of an isosceles triangle. However, the particular angles of that isosceles triangle can vary as shown plastic parts 140, 142, and 144 (FIG. 12A). That triangle can be tall and thin or short and wide, and its angles are not limited to those shown in FIG. 12A.

Likewise, the portions of surfaces 38 and 39 that are located above the plane occupied by surface 25T should always form a second isosceles triangle with the plane occupied by surface 25T. The angles of this second triangle can vary, but it must remain similar to the previously mentioned triangle.

Finally, in FIG. 6B (sectional view of FIG. 1B), surfaces 34C and 34D of the female connector 16, in conjunction with the plane occupied by surface 27T, should always form a third isosceles triangle. The angles of this third triangle can vary in the same manner as the previously mentioned angles, with the requirement that this triangle must remain similar to the two previously described triangles.

As with the preferred embodiment, the lengths of these alternative connectors must parallel any slope of the surfaces into which they are incorporated. That slope is determined relative to the direction of mold pull of the mold that creates the connectors.

OPERATION

First Alternative Embodiments

These alternative embodiments operate in exactly the same manner as the preferred embodiment, except that they can be incorporated into multi-faceted modules with a broader range of surface slopes relative to their direction of mold pull.

DESCRIPTION

Second Alternative Embodiments—FIG. 12C

FIG. 12C (side view) shows an arch with a void that 146 is not centrally positioned. A void such as void 146 may be positioned at any location along the base of an arch. Furthermore, a void may have any proportions, relative to the size of the arch in which it is located, as long as it is smaller than the arch itself.

OPERATION

Second Alternative Embodiments

These alternative embodiments operate in exactly the same manner as the preferred embodiment. The primary function that could be served by employing such embodiments in a module is that the position of the overall arch can be shifted relative to that arch's void. This allows cooperating slots to "snap in" to the same position, even though the arch with which they are cooperating has shifted somewhat. In some situations, when the position of an arch is in conflict with some other surface feature of a module, shifting that arch can facilitate its incorporation into the module.

DESCRIPTION

Third Alternative Embodiments—FIG. 12D

FIG. 12D (side view) shows another way in which embodiments of my connectors might vary. Alternative arches 148, 150, 152, 154, and 156 show that my male connectors' arches do not have to be isosceles. They simply have to be free of undercuts when incorporated into a module. All of the arches pictured in FIG. 12D are free of undercuts when the surfaces into which they are attached are tilted at no more than a 45° angle, relative to perpendicularity to their direction of mold pull.

OPERATION

Third Alternative Embodiments—FIG. 12D

These alternative embodiments operate in exactly the same manner as the preferred embodiment. Some of these embodiments, such as alternative arches 148 and 150, could serve the purpose of making my connectors less sharp, and therefore more comfortable to use. Alternative arches 154 and 156 have no foreseen advantages, but are included simply to demonstrate the range of acceptable arch designs that would, in fact, work.

CONCLUSION, RAMIFICATIONS, AND SCOPE

Thus the reader will see that the connector system of this invention represents what the prior art has never fully succeeded in producing—an effective, economical means of connecting multi-faceted modules. The most salient feature of my connectors is their unique ability to be molded at a variety of angles, relative to the direction of mold pull. Identical, compatible iterations of my connectors can be incorporated into variously inclined surface portions of a single molded piece of material. In addition, this molding can be done with a simple, durable, straight-pull mold. This moldability allows complex, interconnectable, multi-faceted construction modules to be manufactured at a low cost. Furthermore, my connectors have the additional advantages in that

- they can engage with one another at a variety of angles. This feature is an important prerequisite for building many structures with multi-faceted construction modules, since the required configurations often demand that multiple pairs of mating surfaces engage simultaneously at different angles of approach.
- two planar arrays of my connectors can be connected "piecemeal." Since planar arrays of my connectors can be connected a few at a time, less force required to snap them and unsnap them. Piecemeal connection also reduces the difficulty of aligning those arrays to begin engaging them.
- the "play" in their connections allows a user to wiggle, flex, and otherwise perturb multiple-module structures without necessarily causing those structures to come apart.
- the "play" in their connections compensates for minor dimensional inaccuracies in the modules into which they are incorporated. Modules incorporating my connectors can still be snapped together even when their geometries, or my connectors' placements on their surfaces, are imperfect.
- they are tolerant of tooling inaccuracies in their own dimensions. If my connectors' fit has been made too tight by the manufacturer, they can still be snapped together. What's more, my connectors' tightness of fit self-adjusts during a "break-in" period of use. During the break-in period, the connectors of a module, including those whose fit was accidentally made too tight, approach a comfortable equilibrium tightness.
- they are durable; when my connectors are kept snapped together for long periods of time, their anchoring force is not diminished.
- they are effective at a very small scale. My connectors are effective even when their male members are too small to penetrate significantly through the wall thickness of an adjoining module.
- they connect with a pleasant "snap."

While my above description contains many specificities, these should not be construed as limitations on the scope of the invention, but rather as an exemplification of one preferred embodiment thereof. Many other variations are possible. For example,

- while my male and female connectors that are to be used in conjunction must be of substantially matching dimensions, those dimensions can vary. They can vary in width, length, and/or height.
- The amount of interference between a female connector's projections and the walls of the arch that those projections snap past can vary. That interference can be increased or decreased in order to achieve tightening or loosening of the snap-fit.
- Material may be added to or removed from both the male and female connectors in order to adjust the amount of play that exists once the connectors are fully engaged.
- My connectors can be manufactured in many different materials and many different colors.
- My connectors may be incorporated into toys or any other objects that need to be releasably connectable.
- My connectors can be adjusted in other minor ways in order to facilitate injection molding.
- My connectors may be used whole or in part.
- My connectors may be spaced about a surface in any manner. There is no required distance between male and female connectors.
- My connectors may be incorporated into a surface with any male-to-female ratio of connectors. Though they operate in heterosexual pairs, there is no reason that the number of male and female connectors has to be equal.
- My connectors can be oriented in any manner. They may lie parallel to one another; they may lie perpendicular; and they may also lie at any other angle to one another, as long as they can be easily molded in those orientations.
- Any edges that are rounded in the preferred embodiment may also be beveled.
- The radii of all of the rounded edges and surfaces of my preferred embodiment may vary. In other words, the extent of their roundness can vary extensively. Furthermore, the individual radii of my connectors' edges and surfaces can vary independently of one another.
- Edges of the preferred embodiment that were straight may be rounded or beveled.
- In order to facilitate molding, the walls of the slots can be altered. Likewise, the walls of the void beneath each arch can also be altered. Much of the volume and design of those spaces exists for molding purposes only, and has nothing to do with functionality once the module has been produced.
- The lengths of edges 36A, 36B, 36C, and 36D (FIG. 3A) can vary. Alternatively, those edges can be eliminated.
- My connectors can be incorporated into modules with faceted or curved surfaces. FIG. 12B (perspective view) shows my connectors incorporated into a module with a spherical surface.

Thus the scope of the invention should be determined not by the embodiments illustrated, but by the appended claims and their legal equivalents.

I claim:

1. A multifaceted module with compatible snap connectors in variously angled surfaces comprising:
   (a) a one piece rigid module comprising a first wall portion, a second wall portion, and a third wall portion
   (b) said first wall portion, comprising a first top surface, a first bottom surface, and a first male connector, said first male connector comprising an arch and a void, said arch protruding from said first top surface, said void forming the underside of said arch and thereby having openings to the sides of said arch, and said void also opening to said first bottom surface
   (c) said second wall portion, permanently deviating from parallel to said first wall portion by at least forty-five degrees and comprising a second top surface, a second bottom surface, and a second male connector, said second male connector being identical to said first male connector (d) said third wall portion, permanently deviating from parallel to said first wall portion by at least forty-five degrees and comprising a third top surface, a third bottom surface, and a female connector, said female connector comprising a slot and two projections, said slot perforating said third wall portion and being bounded by a first pair and a second pair of opposing inner surfaces, said projections protruding oppositely into said slot, one from each of said first pair of opposing inner surfaces whereby said one piece rigid module may incorporate compatible snap connectors into multiple, permanently angled surfaces while being moldable with a straight pull injection mold.

2. The multifaceted module of claim 1 wherein said module is straight pull injection molded with an established direction of mold pull, and wherein said first wall portion has a first slope, said first slope deviating substantially from perpendicularity to said direction of mold pull and paralleling said first male connector, and wherein said arch is isosceles, having base angles equal to a predetermined angle, said predetermined angle not exceeding a compliment of said first slope.

3. The multifaceted module of claim 2 wherein said second wall portion has a second slope, said second slope deviating substantially from perpendicularity to said direction of mold pull and paralleling said second male connector, and wherein said predetermined angle does not exceed a compliment of said second slope.

4. The multifaceted module of claim 3 wherein said arch, said openings, and said projections are isosceles triangles having base angles equaling said predetermined angle, and wherein said projections have bases coplanar with said third top surface and apices directed toward said third bottom surface.

5. The multifaceted module of claim 4 wherein said predetermined angle approximates the least of the complimentary angles of said first slope and said second slope.

6. The multifaceted module of claim 4 wherein said predetermined angle equals forty-five degrees.

7. The multifaceted module of claim 2 wherein said third wall portion has a second slope, said second slope deviating substantially from perpendicularity to said direction of mold pull and paralleling said slot.

8. The multifaceted module of claim 7 wherein said arch, said openings, and said projections are isosceles triangles having base angles equaling said predetermined angle, said predetermined angle not exceeding the least of the complimentary angles of said first slope and said second slope, and wherein said projections have bases coplanar with said third top surface and apices directed toward said third bottom surface.

9. The multifaceted module of claim 8 wherein said predetermined angle equals forty-five degrees.

10. A multifaceted module with compatible snap connectors in variously angled surfaces comprising:

(a) a one piece rigid module comprising a first wall portion, a second wall portion, and a third wall portion (b) said first wall portion, comprising a first top surface, a first bottom surface, and a first male connector, said first male connector comprising an arch and a void, said arch protruding from said first top surface, said void forming the underside of said arch and thereby having an opening to a side of said arch, and said void also opening to said first bottom surface (c) said second wall portion, permanently deviating from parallel to said first wall portion by at least forty-five degrees and comprising a second top surface, a second bottom surface, and a second male connector, said second male connector being identical to said first male connector (d) said third wall portion, permanently deviating from parallel to said first wall portion by at least forty-five degrees and comprising a third top surface, a third bottom surface, and a female connector, said female connector comprising a slot and a projection, said slot perforating said third wall portion and being bounded by a first pair and a second pair of opposing inner surfaces, said projection protruding medially from one of said first pair of opposing inner surfaces;

whereby said one piece rigid module may incorporate compatible snap connectors into multiple, permanently angled surfaces while being moldable with a straight pull injection mold.

11. The multifaceted module of claim 10 wherein said module is straight pull injection molded with an established direction of mold pull, and wherein said first wall portion has a first slope, said first slope deviating substantially from perpendicularity to said direction of mold pull and paralleling said first male connector, and wherein said arch is isosceles, having base angles equal to a predetermined angle, said predetermined angle not exceeding a compliment of said first slope.

12. The multifaceted module of claim 11 wherein said second wall portion has a second slope, said second slope deviating substantially from perpendicularity to said direction of mold pull and paralleling said second male connector, and wherein said predetermined angle does not exceed a compliment of said second slope.

13. The multifaceted module of claim 12 wherein said arch, said opening, and said projection are isosceles triangles having base angles equaling said predetermined angle, and wherein said projection has a base coplanar with said third top surface and an apex directed toward said third bottom surface.

14. The multifaceted module of claim 13 wherein said predetermined angle approximates the least of the complimentary angles of said first slope and said second slope.

15. The multifaceted module of claim 13 wherein said predetermined angle equals forty-five degrees.

16. The multifaceted module of claim 11 wherein said third wall portion has a second slope, said second slope deviating substantially from perpendicularity to said direction of mold pull and paralleling said slot.

17. The multifaceted module of claim 16 wherein said arch, said opening, and said projection are isosceles triangles having base angles equaling said predetermined angle, said predetermined angle not exceeding the least of the complimentary angles of said first slope and said second slope, and wherein said projection has a base coplanar with said third top surface and an apex directed toward said third bottom surface.

18. The multifaceted module of claim 17 wherein said predetermined angle equals forty-five degrees.

19. A multifaceted module with compatible snap connectors in variously angled surfaces comprising:

(a) a module comprising a first wall portion, a second wall portion, and a third wall portion (b) said first wall portion, comprising a first top surface, a first bottom surface, and a first male connector, said first male connector comprising an arch and a void, said arch protruding from said first top surface, said void forming the underside of said arch and thereby having an opening to a side of said arch, and said void also opening to said first bottom surface (c) said second wall portion, permanently and substantially deviating from parallel to said first wall portion and comprising a second top surface, a second bottom surface, and a second male connector, said second male connector being identical to said first male connector (d) said third wall portion, permanently and substantially deviating from parallel to said first wall portion and comprising a third top surface, a third bottom surface, and a female connector, said female connector comprising a slot and a projection, said slot perforating said third wall portion and being bounded by a first pair and a second pair of opposing inner surfaces, said projection protruding medially from one of said first pair of opposing inner surfaces;

whereby differently angled surfaces of a one piece, straight pull injection molded, multifaceted module may identically incorporate compatible snap connectors.

* * * * *